US012578020B2

(12) United States Patent
Ernst et al.

(10) Patent No.: US 12,578,020 B2
(45) Date of Patent: Mar. 17, 2026

(54) INLET CONTROLLED REGULATING VALVE

(71) Applicant: RESIDEO LLC, Golden Valley, MN (US)

(72) Inventors: Dominik Ernst, Mosbach (DE); Ralf Hilbers, Waldbrunn (DE); Michael Ackermann, Mosbach (DE)

(73) Assignee: RESIDEO LLC, Golden Valley, MN (US)

( * ) Notice: Subject to any disclaimer, the term of this patent is extended or adjusted under 35 U.S.C. 154(b) by 0 days.

(21) Appl. No.: 18/628,893

(22) Filed: Apr. 8, 2024

(65) Prior Publication Data

US 2025/0067345 A1    Feb. 27, 2025

Related U.S. Application Data

(63) Continuation of application No. 16/917,632, filed on Jun. 30, 2020, now Pat. No. 11,953,098.

(51) Int. Cl.
*F16K 1/30* (2006.01)
*F16K 1/52* (2006.01)
*F16K 1/54* (2006.01)

(52) U.S. Cl.
CPC ................ *F16K 1/304* (2013.01); *F16K 1/52* (2013.01); *F16K 1/54* (2013.01)

(58) Field of Classification Search
CPC .. G05D 16/0655; G05D 16/163; G05D 16/16; G05D 16/0647; F16K 31/128; F16K 31/1266; F16K 17/28; F16K 17/10; F16K 1/54; F16K 1/52; F16K 1/304
See application file for complete search history.

(56) References Cited

U.S. PATENT DOCUMENTS

| | | | |
|---|---|---|---|
| 2,320,886 A | 6/1943 | Quiroz | |
| 2,895,507 A | 7/1959 | Orser | |
| 3,049,141 A | 8/1962 | Beatty et al. | |
| | (Continued) | | |

FOREIGN PATENT DOCUMENTS

| | | | |
|---|---|---|---|
| CN | 205938038 U | 2/2017 | |
| CN | 207848441 U | 9/2018 | |
| | (Continued) | | |

OTHER PUBLICATIONS

International Search Report and Written Opinion for International Application No. PCT/US2021/035867, mailed Oct. 4, 2021; 13 pages.

*Primary Examiner* — Craig M Schneider
*Assistant Examiner* — Andrew J Rost
(74) *Attorney, Agent, or Firm* — Greenberg Traurig, LLP; Ryan D. Sharp; David J. Dykeman

(57) ABSTRACT

In some examples, a pressure reducing valve includes a valve body defining a defining a flow path and a restricting element within the flow path. A sensing element is configured to modify a position of the restricting element in the flow path. A pressure chamber is configured to transmit a force to the sensing element based on the pressure of a fluid within the pressure chamber. An energy accumulator is in fluid communication with the pressure chamber. The pressure reducing valve includes control circuitry configured to enable a fluid to flow into or discharge from the pressure chamber to alter the pressure in the pressure chamber.

18 Claims, 5 Drawing Sheets

(56)     References Cited

U.S. PATENT DOCUMENTS

| | | | |
|---|---|---|---|
| 3,136,333 A | 6/1964 | Griswold | |
| 3,146,786 A | 9/1964 | Ishikawa | |
| 3,868,972 A | 3/1975 | Zirps | |
| 5,887,847 A | 3/1999 | Holborow | |
| 5,967,176 A | 10/1999 | Blann et al. | |
| 6,032,919 A | 3/2000 | Giacomino et al. | |
| 6,155,301 A | 12/2000 | Ohji et al. | |
| 6,244,561 B1 | 6/2001 | Hansen et al. | |
| 6,584,999 B2 | 7/2003 | Inayama et al. | |
| 8,597,849 B2 | 12/2013 | Junge et al. | |
| 9,052,020 B2 | 6/2015 | Noceti | |
| 9,298,190 B2 | 3/2016 | Oksanen et al. | |
| 9,527,198 B2 | 12/2016 | Moore | |
| 9,760,097 B2 | 9/2017 | Masias et al. | |
| 10,203,705 B1 | 2/2019 | Rowe et al. | |
| 10,215,320 B2 * | 2/2019 | Arndt | F17C 1/00 |
| 10,495,116 B2 | 12/2019 | Benettolo | |
| 11,953,098 B2 * | 4/2024 | Ernst | F16K 1/52 |
| 2002/0036013 A1 | 3/2002 | Inayama et al. | |
| 2008/0023662 A1 | 1/2008 | Reinicke et al. | |
| 2017/0045898 A1 | 2/2017 | Pohjola | |

FOREIGN PATENT DOCUMENTS

| | | | |
|---|---|---|---|
| CN | 109899587 A | 6/2019 | |
| KR | 100540392 B1 | 1/2006 | |
| KR | 20160014660 A | 2/2016 | |
| WO | 03057998 A2 | 7/2003 | |
| WO | 2014197429 A1 | 12/2014 | |
| WO | 2019082189 A1 | 5/2019 | |

* cited by examiner

INLET CONTROLLED REGULATING VALVE

TECHNICAL FIELD

The disclosure relates to pressure regulating valves.

BACKGROUND

Pressure regulating devices are frequently used in industrial and residential systems designed to deliver fluid flows to one or more gaseous or liquid fluid loads. The pressure regulating devices may be employed to deliver or maintain the delivered fluid within predetermined pressure parameters selected based on, for example, system integrity, process controls, various equipment restrictions, and/or other reasons. Pressure regulating devices may operate by sensing pressure fluctuations and making corrective adjustments around a pressure setpoint. Such pressure regulating devices may be employed within fluid delivery systems to maintain pressures downstream or upstream of the device.

SUMMARY

In examples described herein, a pressure regulating valve is configured to control a fluid pressure in a fluid circuit, such as piping header in a fluid distribution system, by reducing the pressure of a higher pressure fluid using a restricting element. The pressure regulating valve is configured to position the restricting element using a sensing element. The pressure regulating valve includes a pressure chamber and a valve configured to enable a fluid having a fluid energy to flow to the pressure chamber. The pressure chamber is configured to deliver a first portion of the fluid energy to the sensing element and a second portion of the fluid energy to an energy accumulator. The energy accumulator is configured to generate stored energy using the second part of the fluid energy, and may be configured to exert a pressure on the pressure chamber when, for example, a pressure in the pressure chamber decreases. The valve may be configured to enable the fluid to flow to the pressure chamber from an inlet of the pressure regulating valve.

In some examples, the pressure regulating valve includes control circuitry configured to determine a pressure at an outlet of the pressure regulating valve and compare the outlet pressure to a pressure setpoint. In response to the comparison, the control circuitry may increase or decrease a pressure in the pressure chamber. The control circuitry is configured to increase and decrease the pressure by at least controlling a position of one or more valves. For example, the control circuitry can increase the pressure in the pressure chamber by at least causing a valve to enable the fluid having the fluid energy to flow into the pressure chamber and decrease the pressure in the pressure chamber by at least causing a valve (the same or different valve as the valve used to increase pressure in the pressure chamber) to enable a fluid in the pressure chamber to discharge from the pressure chamber.

This disclosure also describes example techniques of using the pressure regulating valve to regulate a pressure.

In one example, this disclosure is directed to a pressure regulating valve comprising: a restricting element; a valve body defining a pressure chamber; one or more valves in fluid communication with the pressure chamber, wherein the one or more valves are configured to enable a fluid having a fluid energy to flow to the pressure chamber, a sensing element configured to position the restricting element using a first portion of the fluid energy; and an energy accumulator configured to generate stored energy using a second portion of the fluid energy, wherein the pressure chamber is configured to deliver the first portion of the fluid energy to the sensing element, and wherein the pressure chamber is configured to deliver the second portion of the fluid energy to the energy accumulator.

In another example, the disclosure is directed to a pressure regulating valve comprising: a valve inlet; a valve outlet; a restricting element between the valve inlet and the valve outlet; a valve body defining a pressure chamber; an inlet pressure line between the valve inlet and the pressure chamber; an outlet pressure line between the valve outlet and the pressure chamber; one or more valves in fluid communication with the pressure chamber, wherein the one or more valves are configured to: enable a fluid having a fluid energy to flow from the valve inlet to the pressure chamber through the inlet pressure line, and configured to enable a fluid in the pressure chamber to discharge from the pressure chamber to the valve outlet through the outlet pressure line; a sensing element configured to position the restricting element using a first portion of the fluid energy; and an energy accumulator configured to generate stored energy using a second portion of the fluid energy, wherein: the pressure chamber is configured to deliver the first portion of the fluid energy to the sensing element, the pressure chamber is configured to deliver the second portion of the fluid energy to the energy accumulator, and the energy accumulator is configured to exert a pressure on a fluid in the pressure chamber using the stored energy.

In another example, the disclosure is directed to a method including delivering a fluid having a fluid energy to a pressure chamber of a pressure regulating valve using one or more valves; delivering a first portion of the fluid energy to a sensing element using the pressure chamber; delivering a second portion of the fluid energy to an energy accumulator using the pressure chamber; positioning a restricting element using the sensing element and the first portion of the fluid energy; and storing energy using the energy accumulator and the second portion of the fluid energy.

The details of one or more examples are set forth in the accompanying drawings and the description below. Other features, objects, and advantages will be apparent from the description and drawings, and from the claims.

DETAILED DESCRIPTION

Figure 1:
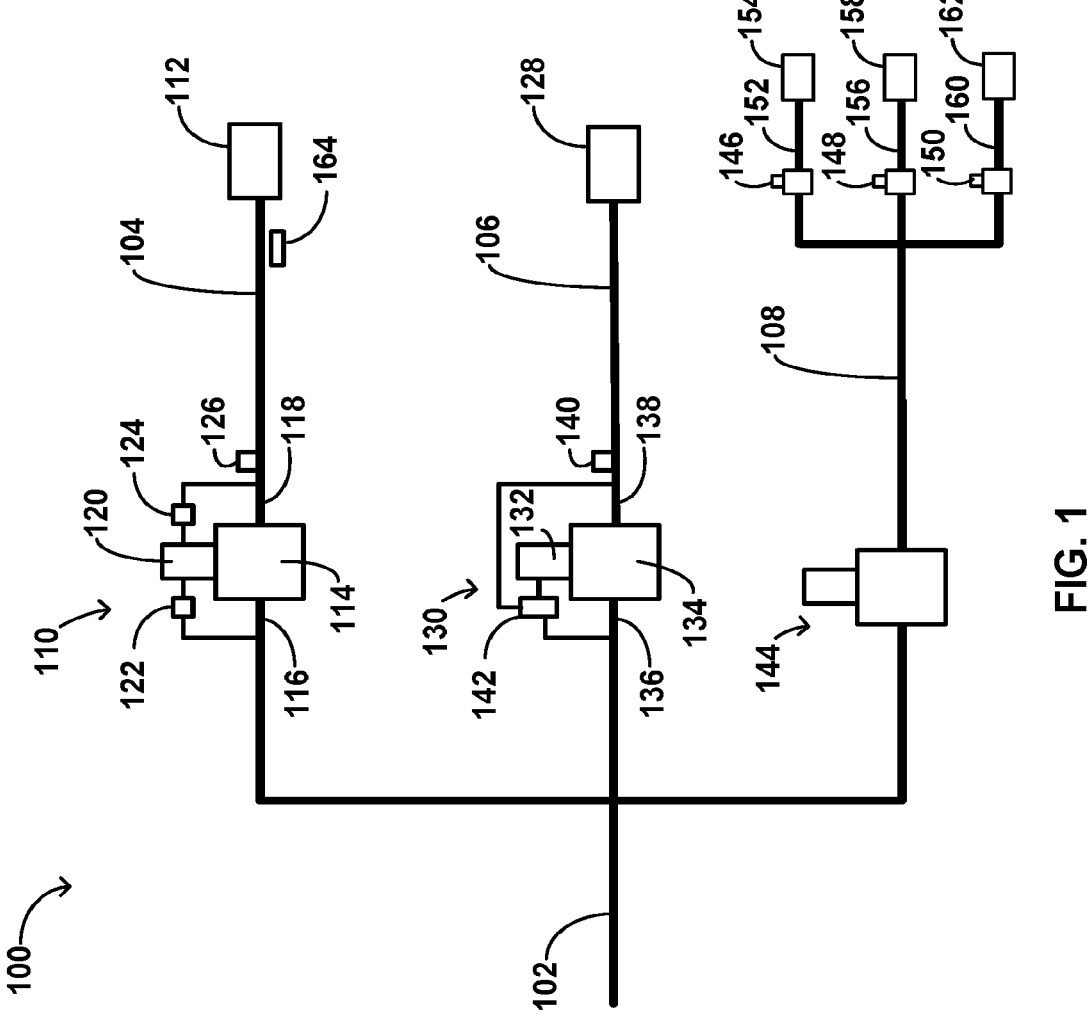
FIG. 1 is a conceptual diagram illustrating an example fluid system.

Pressure regulating valves are used in industrial and residential applications to control a pressure of a fluid in a fluid circuit. In some example systems, pressure regulating valves are situated between a main, higher pressure circuit and one or more branch, lower pressure circuits. The pressure regulating valve so situated may manipulate fluid flows provided from the main circuit in order to compensate for increases or decreases in demand by the one or more branch circuits, increases in the pressure of the main circuit, or some other load disturbance or combination of load disturbances.

For example, in some water distribution systems, pressure regulating valves may be used between a pumping station and a piping network serving consumers, in order to maintain a substantially constant water pressure in the piping network as demand among consumers fluctuates. As another example, in some natural gas delivery systems, pressure regulating valves may be used to reduce gas pressure from transmission pipelines to a distribution tap serving farm for a community. Within industrial settings such as chemical processing plants, oil refineries, and the like, pressure regulating valves may be used between multiple primary and secondary branch circuits in order to control various processes involving the precise control of one or more fluids, or to provide relatively steady-state pressures to, for example, air or water service branches which experience unpredictable, transitory demands. Because many end-user fluid demands require the fluid to be delivered to a secondary branch or maintained in a main branch in accordance with predetermined pressure parameters, pressure regulating valves are often employed to substantially maintain downstream or upstream pressures.

In examples described herein, a pressure regulating valve (PRV) is configured to help control a flow from a higher pressure main circuit to a lower pressure branch circuit. The PRV includes a valve body defining a flow path from a PRV inlet to a PRV outlet. The PRV is configured to enable a flow of a fluid (e.g., a liquid or a gas) through the flow path in order to substantially maintain a pressure at or near the PRV outlet according to a pressure setpoint. For example, the PRV may receive a fluid flow via the PRV inlet from the higher pressure main circuit, reduce the pressure according to the pressure setpoint, and provide the lower pressure fluid flow via the PRV outlet to the branch circuit. The PRV may provide the lower pressure fluid at a pressure substantially equal to the pressure setpoint or within a range around the pressure setpoint (e.g., within about 1% to about 30% of a pressure setpoint, such as within 30% of the pressure setpoint, within 20% of the pressure setpoint, within 10% of the pressure setpoint, within 5% of the pressure setpoint, or within 1% of the pressure setpoint).

The PRV includes a restricting element between the PRV inlet and the PRV outlet which acts in combination with other components of the PRV to define a flow area for the flow path. The PRV is configured such that a fluid flowing through the PRV experiences a pressure decrease (e.g., head loss) as it proceeds through the flow area due at least in part to the obstructing restricting element. The PRV is configured to translate the restricting element to alter the spatial and/or obstruction characteristics of the flow area, which alters the pressure drop experienced by the fluid as it travels through the PRV. Control of this pressure drop through the PRV allows control of a downstream pressure (e.g., at the PRV outlet) when the PRV bridges a higher pressure main circuit and a lower pressure branch circuit.

The PRV includes a sensing element (e.g., a diaphragm or piston) configured to move and translate the restricting element. The sensing element is configured to move based on a difference between a first force exerted by a fluid (e.g., a liquid) in a pressure chamber of the PRV and a second force exerted by a fluid within the flow path of the PRV. In an example, the first force tends to cause the restricting element to increase the flow area (e.g., cause the restricting element to move in an opening direction) while the second force tends to decrease the flow area (e.g., cause the restricting element to move in the closing direction). During operation, the sensing element is configured to establish a position of the restricting element based on balancing the first force and the second force, such that a change to the first force (e.g., exerted by the fluid in the pressure chamber) and/or a change to the second force (e.g., exerted by the fluid within flow path of the PRV) alters the pressure drop experienced by the fluid as it flows through the PRV. Hence, when the second force is exerted by a fluid in the flow path downstream of the restricting element, the PRV may be configured to translate the restricting element in response to changes in a downstream pressure, such as changes in the pressure of a branch circuit supplied by the PRV outlet.

For example, when a pressure in the low pressure side of the PRV (e.g., downstream of the restricting element) increases, the second force acting on the sensing element may increase, causing the restricting element to move in the closing direction and decreasing the flow area. The decreased flow area increases the pressure drop of the fluid flowing past the restricting element, lowering the downstream pressure. When a pressure in the low pressure side of the PRV decreases, the second force acting on the sensing element may decrease, causing the restricting element to move in the opening direction and increasing the flow area. The increased flow area decreases the pressure drop of the fluid flowing past the restricting element, increasing the downstream pressure.

The PRV is configured to establish the first force based on a pressure of a fluid (e.g., a liquid) in the pressure chamber of the PRV. The PRV is configured such that the pressure chamber is fluidly isolable (also referred to as fluidically isolatable) from the flow path defined through the body of the PRV. The PRV is configured to enable a fluid having a fluid energy to flow into the pressure chamber to establish the pressurized pressure chamber, and thereby cause the pressure chamber to exert the first force on the sensing element. The PRV may be configured to enable the fluid to flow into the pressure chamber from a point upstream of the restricting element (e.g., from the PRV inlet, or from a main branch supplying a fluid flow to the PRV inlet). As discussed, the sensing element is configured to establish a position of the restricting element based on balancing the first force and the second force. Hence, the PRV may be configured such a pressure in the pressure chamber causing the first force establishes a pressure setpoint for the PRV. The pressure setpoint for the PRV defines a fluid pressure (e.g., a psi) the PRV seeks to maintain in a fluid downstream of the restricting element, such as at the PRV outlet, the low pressure side of the PRV, or a fluid pressure in a branch circuit supplied by the PRV.

For example, when the PRV acts to increase a pressure in the pressure chamber, the first force acting on the sensing element may increase, causing the restricting element to move in the opening direction and increase the flow area. The increased flow area decreases the pressure drop of the fluid flowing past the restricting element, increasing the downstream pressure based on the increased pressure in the pressure chamber. When the PRV acts to decrease the pressure in the pressure chamber, the first force acting on the sensing element may decrease, causing the restricting element to move in the closing direction and decrease the flow area. The decreased flow area increases the pressure drop of the fluid flowing past the restricting element, decreasing the downstream pressure based on the decreased pressure of the pressure chamber. Thus, the PRV may alter the pressure setpoint by enabling a fluid to flow into the pressure chamber to increase the pressure in the pressure chamber, and/or enabling the fluid in the pressure chamber to discharge from the pressure chamber to decrease the pressure in the pressure chamber.

The pressure chamber of the PRV is configured such that, when the PRV enables the fluid having the fluid energy to flow into the pressure chamber (e.g., to establish and/or increase the pressure setpoint), the pressure chamber delivers a first portion of the fluid energy to the sensing element (to establish the first force) and a second portion of the fluid energy to an energy accumulator. The energy accumulator is configured to store energy using the second portion of the fluid energy. For example, the energy accumulator may be a spring configured to compress when the pressure in the pressure chamber increases, or a bladder configured to compress a gas when the pressure in the pressure chamber increases. The energy accumulator is configured to exert and/or maintain a pressure on the fluid in the pressure chamber. For example, when a movement of the sensing element acts to increase a volume of the pressure chamber (e.g., due to a change in the second force exerted by the fluid flowing through the PRV), the energy accumulator exerts a pressure on the fluid in the pressure chamber to counter-act the expanded volume and substantially maintain a relatively constant pressure in the pressure chamber (substantially maintaining the set point pressure). When the PRV enables the fluid in the pressure chamber to discharge from the pressure chamber to decrease the pressure in the pressure chamber, the energy accumulator exerts a pressure on the fluid in the pressure chamber to drive the fluid from the pressure chamber.

The PRV may be configured to enable a fluid to flow into the pressure chamber from a location upstream of the restricting element, such as a position at or near the PRV inlet or within a main circuit providing fluid to the PRV inlet. Thus, the PRV may be configured to establish a pressure setpoint using fluid tapped from a high pressure side of the PRV. The PRV may be configured to enable a fluid to flow from the pressure chamber to a location downstream of the restricting element, such as a position at or near the PRV outlet or within a branch circuit served by the PRV inlet. The energy accumulator may be configured to exert pressure on the fluid in the pressure chamber to overcome a pressure at the PRV outlet or within the branch circuit, such that the energy accumulator drives the flow from the pressure chamber.

In examples, the PRV includes control circuitry configured to alter a pressure in the pressure chamber based on a predetermined pressure setpoint, e.g., based on a comparison between the pressure setpoint and a pressure downstream of the restricting element of the PRV (e.g., at the PRV outlet). The PRV may include, for example, one or more valves and a pressure sensor configured to generate a signal indicative of a sensed pressure, such as the pressure downstream of the restricting element (e.g., a pressure at the PRV outlet). The control circuitry may be configured to cause, in response to a comparison of the pressure setpoint and sensed pressure, one or more valves to enable a flow of fluid into or from the pressure chamber to alter the pressure in the pressure chamber.

In some examples, the control circuitry is configured to cause a pressurizing valve to enable a fluid to flow into the pressure chamber to increase the pressure in the pressure chamber. In addition to or instead of the controlling the pressurizing valve to alter a pressure in the pressure chamber, in some examples, the control circuitry is configured to cause a venting valve to enable a fluid to flow out of the pressure chamber to decrease the pressure in the pressure chamber. Instead of or in addition to the pressurizing valve and/or the venting valve, in some examples, the control circuitry is configured to cause a three-way valve to establish a first position to enable the fluid to pressurize the pressure chamber and establish a second position to enable a fluid to discharge from the pressure chamber. Thus, the control circuitry may be configured to establish and/or alter a pressure setpoint for the PRV, based on which the PRV provides fluid at the PRV outlet.

In some examples, the PRV is a normally open valve employed to substantially maintain a downstream pressure. The PRV may be configured to operate toward or into a closed position (e.g., by at least decreasing the volume of the flow area) as the downstream pressure increases, and operate toward or into an open position (e.g., by at least increasing the volume of the flow area) as the downstream pressure decreases. Decreasing downstream pressures may be indicative of an increase in demand, prompting the PRV to operate toward or into an open position to allow more flow to a downstream branch circuit. On the other hand, increasing downstream pressures may be indicative of a decrease in demand, prompting the PRV to operate toward or into a closed position to provide less flow to the downstream branch circuit. By treating downstream pressure as a proxy for demand in this manner, the PRV may substantially match the fluid supply from a main circuit to the fluid demand generated in the branch circuit, while substantially maintaining a set pressure downstream of the PRV.

Here and elsewhere, "downstream" means the direction of a fluid flowing from a higher pressure area to a lower pressure area. "Upstream" denotes a direction opposite the downstream direction. For example, when a PRV is configured to provide flow from a higher pressure main circuit to a lower pressure branch circuit, a fluid flowing from the higher pressure main circuit to the lower pressure branch circuit flows in the downstream direction. The direction opposite the direction of fluid flow from the higher pressure main circuit to the lower pressure branch circuit is the upstream direction. Further, an "opening direction" denotes movement of a restricting element and/or a sensing element in a direction which alters the flow area to decrease the pressure loss experienced by a fluid traveling through the PRV. A "closing direction" denotes movement of a restricting element and/or sensing element in a direction which alters the flow area to increase the pressure loss experienced by a fluid traveling through the PRV. Further, the "high pressure side" of the PRV denotes a portion of the valve body defining the flow path upstream of the restricting element. The "low pressure side" of the PRV denotes a portion of the valve body defining the flow path downstream of the restricting element.

FIG. 1 illustrates an example fluid system 100 including a main circuit 102 configured to provide a fluid to branch circuits 104, 106, and 108. Branch circuit 104 is configured to be supplied with a fluid from main circuit 102 via PRV 110, and configured to provide the fluid to fluid load 112. PRV 110 is configured to receive higher pressure fluid from, for example, main circuit 102, and supply the fluid at a lower pressure to branch circuit 104. PRV 110 includes a valve body configured to define a flow path from main circuit 102 to branch circuit 104, and includes a restricting element (not shown in FIG. 1) configured to alter a pressure of the fluid as it flow through the flow path defined by PRV 110. Branch circuit 104 is configured to provide the lower pressure fluid to fluid load 112.

Fluid load 112 may be a load intended to receive fluid at some secondary pressure below the supply pressure of the fluid provided by main circuit 102. For example, fluid load 112 might be a water or air connection intended to operate under relatively constant or transitory demand, where equipment and/or other considerations require that the air or water be provided at a lower pressure than that present within main circuit 102. Fluid load 112 might be, for example, a service fluid connection for a chemical or other industrial process, a cooling water supply for specific equipment, an regulator for an irrigation system, a primary residential water connection, a water supply to a specific household appliance such as a water heater, a dishwasher, or a washing machine, or some other load intended to operate at pressures lower than that supplied by main circuit 102.

PRV 110 is configured to operate in accordance with a specific pressure setpoint, in order to maintain a substantially constant secondary pressure in branch circuit 104 as the main supply pressure of main circuit 102 varies and/or the fluid demand from fluid load 112 varies. For example, PRV 110 may be configured to maintain a secondary pressure in branch circuit 104 within 1% to about 30% of a setpoint pressure, such as within about 1%, 5%, 10%, 20%, or 30% of the setpoint pressure.

PRV 110 includes a valve body 114 defining a flow path between a PRV inlet 116 and a PRV outlet 118. In the example of FIG. 1, PRV 110 is configured such that PRV inlet 116 receives higher pressure fluid from main circuit 102 provides a lower pressure fluid to branch circuit 104 via PRV outlet 118. PRV 110 includes a restricting element (not shown) within the defined flow path and between PRV inlet 116 and PRV outlet 118. PRV 110 is configured to define a flow area using the restricting element and portions of valve body 114. The restricting element is configured to translate to adjust the flow area and adjust (e.g., increase or decrease) a pressure of the fluid supplied to branch circuit 104 via PRV outlet 118. The translation of the restricting element alters the fluid flow characteristics of the flow from PRV inlet 116 to PRV outlet 118 and acts to increase or decrease the pressure of branch circuit 104.

PRV 110 includes a pressure chamber 120. Pressure chamber 120 is configured to impart a pressure and/or force to a sensing element (not shown in FIG. 1) within PRV 110. PRV 110 is configured such that movement of the sensing element causes movement of the restricting element. The sensing element may be configured such that some portion of the fluid flow proceeding through PRV 110 imparts a pressure on the sensing element generally counter-acting the pressure and/or force imparted by pressure chamber 120. The sensing element is configured to translate in response to the pressure and/or force imparted by pressure chamber 120, changes in the counter-acting pressure of the fluid flow through PRV 110, or changes to both. For example, valve body 114 may define a high pressure side of PRV 110 between PRV inlet 116 and the restricting element and a low pressure side of PRV 110 between the restricting element and PRV outlet 118. PRV 110 may be configured such that a fluid within the low pressure side of PRV 110 acts on the sensing element to counter-act the pressure and/or force imparted by pressure chamber 120, such that PRV 110 translates the restricting element in response to changes in the pressure of the fluid within the low pressure side.

Pressure chamber 120 is configured to impart the pressure and/or force to the sensing element using a pressurized fluid held within pressure chamber 120. Pressure chamber 120 is fluidly isolable from the flow path between PRV inlet 116 and PRV outlet 118, such that fluctuations in the pressure of branch circuit 104 and/or main circuit 102 have limited or no impact on the pressure within pressure chamber 120. Further, pressure chamber 120 is configured such that the pressure of the fluid within pressure chamber 120 is adjustable, e.g., via one or more valves. For example, PRV 110 may include a pressurizing valve 122 configured to enable a flow of fluid from PRV inlet 116, the high pressure side of PRV 110, and/or main circuit 102, into pressure chamber 120 in order to increase a pressure in pressure chamber 120. PRV 110 may include a venting valve 124 configured to enable a flow from pressure chamber 120 to PRV outlet 118, the low pressure side of PRV 110, and/or branch circuit 104 in order to decrease a pressure in pressure chamber 120.

Adjusting the pressure of the fluid within pressure chamber 120 acts to adjust the pressure and/or force imparted to the sensing element within PRV 110, and thus may act to adjust a pressure setpoint of PRV 110. Pressurizing valve 122 and venting valve 124 may be configured to fluidly isolate pressure chamber 120 from the flow path between PRV inlet 116 and PRV outlet 118 when not being utilized to increase or decrease respectively the pressure of pressure chamber 120.

In examples, in addition to or instead of pressurizing valve 122 and/or venting valve 124, PRV 110 includes a three-way valve having a first position and a second position. The first position may be configured to enable a flow substantially from PRV inlet 116, the high pressure side of PRV 110, and/or main circuit 102 to pressure chamber 120. In the first position, the three-way valve may prevent fluid from flowing from pressure chamber 120 substantially to PRV outlet 118, the low pressure side of PRV 110, and/or branch circuit 104. In the second position, the three-way valve is configured to enable a flow from pressure chamber 120 substantially to PRV outlet 118, the low pressure side of PRV 110, and/or branch circuit 104. In addition, in the second position, the three-way valve may prevent fluid from flowing from PRV inlet 116, the high pressure side of PRV 110, and/or main circuit 102 to pressure chamber 120.

As will be discussed, pressure chamber 120 is configured such that, when pressurizing valve 122 enables the fluid flow into pressure chamber 120, pressure chamber 120 delivers a first portion of the fluid energy of the fluid flow to the sensing element and delivers a second portion of the fluid energy of the fluid flow to an energy accumulator. The energy accumulator is configured to generate stored energy using the second portion of the fluid energy. For example, the energy accumulator may be a spring configured to compress when the pressure in pressure chamber 120 increases, or a bladder configured to compress a gas when the pressure in pressure chamber 120 increases. The energy accumulator is configured to exert and/or maintain a pressure on the fluid in pressure chamber 120 when, for example, movement of the sensing element acts to increase a volume of pressure chamber 120 and/or venting valve 124 opens to enable flow from pressure chamber 120 to PRV outlet 118, the low pressure side of PRV 110, and/or branch circuit 104.

Use of the energy accumulator to substantially maintain a pressure on the fluid in pressure chamber 120 may be advantageous when the fluid within pressure chamber 120 is a substantially incompressible liquid (e.g., water). For example, when the fluid in pressure chamber 120 is water and pressure chamber 120 relies on a pressure of the water to impart a pressure and/or force to the sensing element, potential movements of the sensing element may be limited by the incompressibility of the water (e.g., the limited ability of water to expand and/or compress at a constant pressure). As will be discussed, use of an energy accumulator may enable a greater range of travel for the sensing element for a given pressure setpoint of PRV 110, increasing the sensitivity of PRV 110. Use of the energy accumulator to substantially maintain the pressure in pressure chamber 120 may enable PRV 110 to discharge the fluid via venting valve 124.

PRV 110 may include control circuitry configured to cause pressurizing valve 122 and/or venting valve 124 to enable a flow into or from pressure chamber 120. In some examples, the control circuitry is configured to receive a signal indicative of a sensed pressure, such as a pressure of PRV outlet 118 and/or branch circuit 104, and adjust a pressure in pressure chamber 120 based on the signal using pressurizing valve 122 and/or venting valve 124. The control circuitry may be configured to receive the signal indicative of the pressure from one or more pressure sensors. The control circuitry may be configured to compare the signal indicative of the pressure with a predetermined pressure setpoint and adjust the pressure in pressure chamber 120 based on the comparison. In examples, the control circuitry may be configured to determine the pressure setpoint based on an input (e.g., a user input) and adjust the pressure in pressure chamber 120 based on the input. The control circuitry may be configured to pressurize and/or vent pressure chamber 120 using pressurizing valve 122 and/or venting valve 124 until a signal from the pressure sensor indicates a pressure (e.g., a pressure at PRV outlet 118 and/or branch circuit 104) substantially matching (within an allowed tolerance) the setpoint pressure. For example, the control circuitry may be configured to pressurize and/or vent pressure chamber 120 until a signal from the pressure sensor indicates a pressure within about 1% to about 30% of a setpoint pressure, such as within about 1%, 5%, 10%, 20%, or 30% of the setpoint pressure.

The control circuitry may be located adjacent or within a housing of PRV 110, or be positioned elsewhere within system 100. Further, although control circuitry of individual PRVs of system 100 are described herein and illustrated at FIG. 1, in some examples, one controller (including control circuitry) may cause individual pressurizing and/or venting valves to enable flows in an individual PRV for multiple PRVs. That is, system 100 can include one or more controllers configured to enable flows in the PRV described herein.

In some examples, PRV 110 is configured to sense an outlet pressure. For example, PRV 110 may include an outlet pressure sensor 126 configured to provide an indication of a pressure downstream of the restricting element, such as a pressure substantially at PRV outlet 118, within the low pressure side of PRV 110, and/or branch circuit 104. Outlet pressure sensor 126 may be located adjacent or within a housing of PRV 110, or be positioned elsewhere within system 100. Outlet pressure sensor 126, as well as other pressure sensors described herein, can include any suitable pressure sensing circuitry and other structure configured to generate a signal indicative of the pressure at the sensing location. Outlet pressure sensor 126 may be configured to generate and provide to the control circuitry of PRV 110 an outlet pressure signal indicative of a pressure at PRV outlet 118.

Hence, PRV 110 may receive a high pressure fluid from main circuit 102, reduce the pressure by positioning a restricting element relative to a flow path within PRV 110, and supply a lower pressure fluid to branch circuit 104. PRV 110 acts to position the restricting element based on a balance between a pressure of the flow path acting on the sensing element and a pressure within pressure chamber 120. When the pressure in main circuit 102 and/or branch circuit 104 varies, PRV 110 repositions the restricting element to substantially maintain the pressure in branch circuit

104. Control circuitry can adjust the pressure of a fluid in pressure chamber 120 (e.g., increased or decreased) to adjust a setpoint pressure using one or more valves, such as pressurizing valve 122, venting valve 124, and/or a three-way valve. PRV 110 includes pressure chamber 120 configured to generate stored energy from a portion of the fluid energy delivered to pressure chamber 120. The energy accumulator acts to maintain a pressure on a fluid in pressure chamber 120 when, for example, venting valve 124 enables a discharge from pressure chamber 120, or a movement of a sensing element within PRV 110 alters a volume of pressure chamber 120. In some examples, PRV 110 includes control circuitry configured to cause pressurizing valve 122, venting valve 124, and/or a three-way valve to increase or decrease a pressure in pressure chamber 120 to adjust a pressure setpoint of PRV 110.

System 100 may include additional branch circuits, such as branch circuit 106. Branch circuit 106 is configured to receive fluid from main circuit 102 via PRV 130 and provide fluid to fluid load 128. Fluid load 128 is a load intended to receive fluid at some particular pressure below the supply pressure of the fluid provided by main circuit 102. The particular pressure based on fluid load 128 may be greater, less than, or equal to the predetermined pressure based on fluid load 112. Correspondingly, a particular pressure setpoint of PRV 130 may be greater, less than, or equal to the specific pressure setpoint of PRV 110. PRV 130 is an example of PRV 110, and includes pressure chamber 132, valve body 134, PRV inlet 136, PRV outlet 138, and outlet pressure sensor 140, which may be configured individually and in relation to each other in the same manner as that described for like named components of PRV 110.

PRV 130 also includes three-way valve 142 having at least a first position and a second position. Three-way valve 142 is configured such that the first position enables a flow substantially from PRV inlet 136, the high pressure side of PRV 130, and/or main circuit 102 to pressure chamber 132. Three-way valve 142 is configured such that the second position enables a flow from pressure chamber 132 substantially to PRV outlet 138, the low pressure side of PRV 130, and/or branch circuit 106. Three-way valve 142 may be configured to include a third position wherein three-way valve 142 fluidly isolates pressure chamber 132 from a flow path flowing from a position upstream of a restricting element of PRV 130 (e.g., main circuit 102, PRV inlet 136, and/or a high pressure side of PRV 130) to a position downstream of the restricting element of PRV 130 (e.g., branch circuit 106, PRV outlet 138, and/or a low pressure side of PRV 130). PRV 130 may include control circuitry configured to control a position of three-way valve 142, e.g., to cause three-way valve 142 to enable a flow into or from pressure chamber 132, and/or cause three-way valve 142 to fluidly isolate pressure chamber 132 from the flow path flowing from the position upstream of the restricting element of PRV 130 to the position downstream of the restricting element of PRV 130.

In some examples, system 100 may further include a branch circuit 108. Branch circuit 108 receives fluid from main circuit 102 via PRV 144. PRV 144 may be an example of PRV 110 or PRV 130, and may substantially maintain an established pressure within branch circuit 108 as the main supply pressure of main circuit 102 and/or downstream fluid demands vary. PRV 144 may act as a primary pressure regulator and provide fluid at an established pressure to secondary pressure regulator 146, secondary pressure regulator 148, and secondary pressure regulator 150, each of which may be an example of PRV 110 and/or PRV 130.

Secondary pressure regulator 146 may be configured to further reduce the pressure of the fluid within branch circuit 108 and provide fluid to tertiary branch 152 and fluid load 154. Secondary pressure regulator 148 may be configured to further reduce the pressure of the fluid within branch circuit 108 and provide the fluid to tertiary branch 156 and fluid load 158. Secondary pressure regulator 150 may be configured to further reduce the pressure of the fluid within branch circuit 108 and provide the fluid to tertiary branch 160 and fluid load 162. Fluid load 154, fluid load 158, and fluid load 162 may require fluid supplied at pressures less than fluid load 112 and/or fluid load 128, and secondary pressure regulator 146, secondary pressure regulator 148, and secondary pressure regulator 150 may be provided in order accomplish the additional pressure reduction in a more accurate manner based on, for example, a droop or other inaccuracy which may occur during operation of PRV 144. For example, PRV 144 might be used to reduce a main supply pressure of about 500 psi (4.35 megapascal) in main circuit 102 to a secondary pressure of about 100 psi (689 kilopascal (kPa)) in branch circuit 108, and secondary pressure regulators 146, 148, 150 might be used to reduce the secondary pressure of about 100 psi (689 kPa) in branch circuit 108 to a pressure less than about 25 psi (172 kPa).

Although PRVs 110, 130, 144, 146, 148, 150 are shown in FIG. 1, system 100 may include any suitable number of pressure regulating valves, and any number of main, branch, or otherwise designated fluid branches. The pressure regulating valves may be configured to receive a higher pressure fluid from a first branch and provide fluid to a second branch while substantially maintaining a pressure in the second branch. A PRV may supply any number of fluid loads and any number of fluid branches. For example, PRV 110 may supply one or more fluid loads in addition to fluid load 112 and one or more fluid branches in addition to branch circuit 104. A main, branch, or otherwise designated fluid branch may receive fluid from any number of upstream pressure regulating valves. Any number of pressure regulating valves may operate in in series or in parallel with any quantity of pressure regulating valves.

Figure 2:
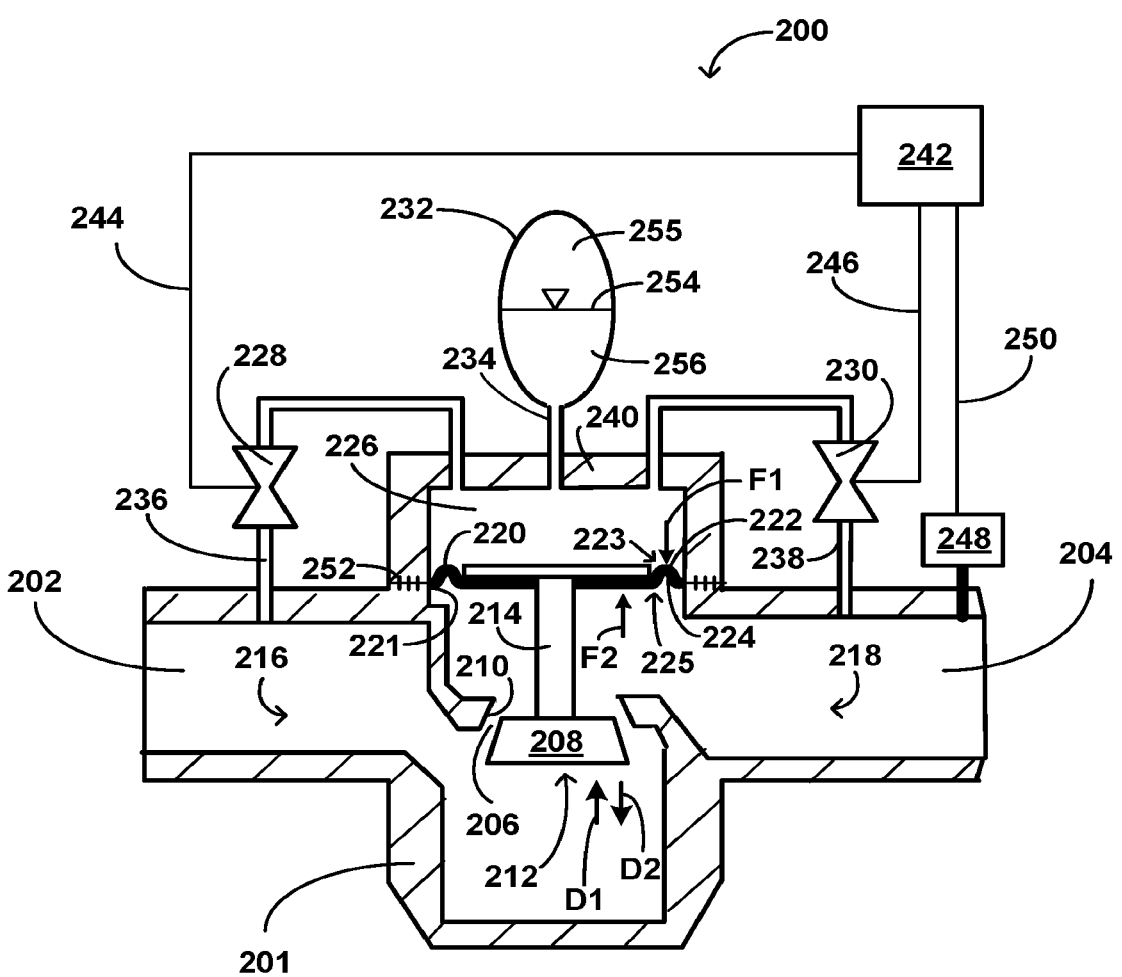
FIG. 2 is a conceptual diagram illustrating an example pressure regulating valve including an energy accumulator.

FIG. 2 illustrates an example PRV 200. PRV 200 includes valve body 201 defining PRV inlet 202 and PRV outlet 204. In FIG. 2, valve body 201 is illustrated in cross-section with a cutting plane parallel to the page. Valve body 201 is configured to define a flow path for a fluid between PRV inlet 202 and PRV outlet 204. For example, valve body 201 may define the flow path from PRV inlet 202, through flow area 206 between valve disc 208 and valve seat 210, and to PRV outlet 204. The flow path may proceed through PRV 200 from a high pressure side 216 of PRV 200 upstream of restricting element 212 to a low pressure side 218 of PRV 200 downstream of restricting element 212. In some examples, PRV 200 is configured to receive a higher pressure fluid at PRV inlet 202 and regulate the fluid flow in order to provide fluid at a lower pressure at PRV outlet 204. For example, PRV 200 may be configured receive a higher pressure fluid from main circuit 102 and provide a lower pressure fluid to branch circuit 104, branch circuit 106, or branch circuit 108 (FIG. 1). Thus, PRV 200 is an example of any of the PRVs described with reference to FIG. 1 (e.g., PRV 110, PRV 130, PRV 144, PRV 146, PRV 148, and/or PRV 150).

In the example shown in FIG. 2, PRV 200 further comprises restricting element 212 including valve stem 214 and valve disc 208, sensing element 220 including a first side 222, a first area 223, a second side 224, and a second area 225, pressure chamber 226, pressurizing valve 228, venting valve 230, energy accumulator 232, conduit 234, inlet conduit 236, outlet conduit 238, valve bonnet 240, control circuitry 242, communication link 244, communication link 246, outlet pressure sensor 248, and communication link 250. In some examples, valve bonnet 240 is configured to be a separable portion of valve body 201. For example, valve bonnet 240 and/or valve body 201 may include threads 252 configured to allow separation of valve bonnet 240 from the remainder of valve body 201 without adversely impacting the structure of valve body 201. Other configurations of valve bonnet 240 may be used in other examples.

The flow path defined by valve body 201 between PRV inlet 202 and PRV outlet 204 includes a flow area 206 within PRV 200, with a geometry of flow area 206 dependent in part on restricting element 212 and a volume (and/or area) of flow area 206 depending on a position of restricting element 212 within PRV 200. Restricting element 212 may comprise, for example, valve stem 214 mechanically coupled to valve disc 208. Flow area 206 is defined by any suitable structures within PRV 200. In some examples, as shown in FIG. 2, flow area 206 is at least partially bounded by valve disc 208 and valve seat 210. PRV 200 is configured to allow restricting element 212 to translate and alter flow area 206. The alteration of flow area 206 may alter the pressure drop a fluid flow experiences between PRV inlet 202 and PRV outlet 204, allowing for the regulation of a fluid flow between PRV inlet 202 and PRV outlet 204.

PRV 200 is configured such the flow path between PRV inlet 202 and PRV outlet 204 encounters restricting element 212 between PRV inlet 202 and PRV outlet 204. High pressure side 216 includes those portions of valve body 201 configured to be in fluid communication with a fluid flowing from PRV inlet 202 to PRV outlet 204 and upstream of restricting element 212. Low pressure side 218 includes those portion of valve body 201 configured to be in fluid communication with a fluid flowing from PRV inlet 202 to PRV outlet 204 and downstream of restricting element 212. PRV 200 may be configured receive a higher pressure fluid from main circuit 102 (FIG. 1) using high pressure side 216 and provide a lower pressure fluid to branch circuit 104, branch circuit 106, or branch circuit 108 using low pressure side 218 (FIG. 1).

PRV 200 further includes a sensing element 220. Sensing element 220 is configured to modify the position of restricting element 212 relative to valve body 201. For example, sensing element 220 may be mechanically coupled to restricting element 212. In examples, sensing element 220 is mechanically coupled to valve stem 214 of restricting element 212. Sensing element 220 may include first side 222 defining a first area 223 and a second side 224 defining a second area 225. PRV 200 is configured such that first side 222 is fluidly isolated from those portions of valve body 201 configured to be in fluid communication with a fluid flowing from PRV inlet 202 to PRV outlet 204. First side 222 is configured to receive a force (e.g., F1) caused at least in part by a pressurized fluid within pressure chamber 226. In some examples, sensing element 220 is configured such that first side 222 is in fluid communication with pressure chamber 226. In other examples, first side 222 is configured to receive a force (e.g., F1) transmitted by a mechanical component such as spring.

Second side 224 of sensing element 220 is configured such that a fluid within low pressure side 218 of PRV 200 exerts a force (e.g., F2) on second side 224. Sensing element 220 is configured such that the force F2 on second side 224 at least partially opposes the force F1 on first side 222. In examples, sensing element 220 is configured such that second area 225 is in fluid communication with the flow path between PRV inlet 202 and PRV outlet 204. Second area 225 may be in fluid communication with some portion of low pressure side 218 of PRV 200. Sensing element 220 may be configured such that second side 224 is fluidly isolated from pressure chamber 226.

In examples, sensing element 220 is configured such that the force on first side 222 (e.g., F1) is substantially equal to the force on second side 224 (e.g., F2) when a pressure in pressure chamber 226 is greater than a pressure in low pressure side 218. For example, sensing element 220 may be configured such that first area 223 in fluid communication with pressure chamber 226 is less than second area 225 in fluid communication with low pressure side 218. The higher pressure in pressure chamber 226 when the force F1 is substantially equal to force F2 may enable PRV 200 to discharge the fluid from pressure chamber 226 to PRV outlet 204, low pressure side 218, or a point downstream of restricting element 212, as will be discussed.

Sensing element 220 may define a perimeter 221 surrounding at least a portion of sensing element 220. Sensing element 220 may be mechanically coupled and/or fixably attached to body 201 and/or valve bonnet 240 around all or some part of perimeter 221. For example, sensing element 220 may be a particular diaphragm defining a perimeter 221 and fixably attached around the entirety of perimeter 221. Sensing element may be a piston with perimeter 221 slidably translatable over some portion of body 201 and/or valve bonnet 240.

Sensing element 220 is configured to move (e.g., by deflection of a diaphragm or translation of a piston) and modify the position of restricting element 212 based on a difference between the force F1 acting on first side 222 and the second force F2 acting on second side 224. Motion of sensing element 220 causes motion of restricting element 212 and adjustment of flow area 206. Adjusting flow area 206 adjusts a pressure drop of fluid flow through flow area 206. "Adjustment" to flow area 206 can refer to the adjustment to a size of flow area, such as an adjustment to a volume of flow area 206. By adjusting positioning restricting element 212 to adjust flow area 206 in this manner, PRV 200 may substantially maintain the fluid pressure within a branch circuit supplied by PRV outlet 204.

For example, when PRV 200 is supplying a branch circuit and fluid load (e.g., branch circuit 104 and fluid load 112 (FIG. 1)), an increase in fluid demand from the fluid load (e.g., fluid load 112) may act to decrease fluid pressure in the branch circuit (e.g., branch circuit 104). With PRV outlet 204 providing fluid to the branch circuit, the decrease in fluid pressure in the branch circuit acts to decrease a fluid pressure within low pressure side 218 of PRV 200. The decrease in fluid pressure within low pressure side 218 acts to decrease the fluid pressure acting on second area 225, decreasing the second force F2 and causing sensing element 220 to reposition restricting element 212 in a manner that decreases a pressure drop of the fluid as it flows through flow area 206 (e.g., sensing element 220 repositions restricting element 212 in an opening direction such as D2 to increase flow area 206). The decreased pressure loss through flow area 206 causes an increase in the fluid pressure within low pressure side 218 of PRV 200, increasing the pressure in the branch circuit. In this way, PRV 200 may act to substantially maintain a setpoint pressure within a branch circuit (e.g., branch circuit 104) when fluid demand from a fluid load (e.g., fluid load 112) increases. In some examples, "substantially maintaining" a pressure described herein can include, for example, maintaining the pressure within 1%-10% of a particular pressure value, such as within 1%, 2%, 3%, 4%, 5% or 10% of the particular pressure value.

When PRV 200 is supplying the branch circuit and fluid load (e.g., branch circuit 104 and fluid load 112 (FIG. 1)), a decrease in fluid demand from the fluid load (e.g., fluid load 112) may act to increase fluid pressure in the branch circuit (e.g., branch circuit 104). When PRV outlet 204 is providing fluid to the branch circuit, the increase in fluid pressure in the branch circuit acts to increase a fluid pressure within low pressure side 218 of PRV 200, increasing the second force F2 and causing sensing element 220 to reposition restricting element 212 in a manner that increases a pressure drop of the fluid as it flows through flow area 206 (e.g., sensing element 220 repositions restricting element 212 in a closing direction such as D1 to decrease flow area 206). The increased pressure loss through flow area 206 causes a decrease in the fluid pressure within low pressure side 218 of PRV 200, decreasing the pressure in the branch circuit. In this way, PRV 200 may act to substantially maintain a setpoint pressure within a branch circuit (e.g., branch circuit 104) when fluid demand from a fluid load (e.g., fluid load 112) decreases.

In this manner PRV 200 may regulate a flow from PRV inlet 202 to PRV outlet 204 to substantially maintain a fluid pressure downstream of flow area 206, based on a force differential across sensing element 220. For example, PRV 200 may maintain the downstream fluid pressure within at least 1% to about 30% of a setpoint pressure, such as within about 1%, 5%, 10%, 20%, or 30% of the setpoint pressure.

In the example shown in FIG. 2, pressure chamber 226 is defined or surrounded at least in part by valve body 201 and/or valve bonnet 240 of PRV 200, which can be formed from any suitable material, such as, but not limited to metals, polymers, ceramics, or combinations thereof. In some examples, pressure chamber 226 is defined or surrounded at least in part by sensing element 220. Pressure chamber 226 may comprise a volume surrounded by a substantially gas-tight (e.g., gas-tight or gas-tight to the extent permitted by manufacturing tolerances) boundary. The volume may have any suitable shape. PRV 200 is configured such that movement of sensing element 220 (e.g., due to alterations in the force F1 and/or the force F2) may cause pressure chamber 226 to expand or contract, such that the volume of pressure chamber 226 increases or decreases respectively.

In examples, PRV 200 is configured such that movement of sensing element 220 (e.g., in the direction D1 and/or D2) causes an increase or decrease in the volume of pressure chamber 226. For example, motion of sensing element 220 (e.g., in the direction D1) may cause pressure chamber 226 to contract, decreasing the volume of pressure chamber 226. Motion of sensing element 220 (e.g., in the direction D2) may cause pressure chamber 226 to expand, increasing in the volume of pressure chamber 226.

PRV 200 is configured to increase or decrease a pressure of the fluid within pressure chamber 226 in order to increase or decrease the pressure setpoint (e.g., by increasing or decreasing the force F1). In examples, PRV 200 includes one or more valves, such as pressurizing valve 228 and venting valve 230 in the example of FIG. 2, configured to enable a fluid to flow into pressure chamber 226 to increase the fluid pressure, or enable a fluid to discharge from pressure chamber 226 to decrease the fluid pressure. PRV 200 may be configured to fluidly isolate pressure chamber 226 from the flow path defined by valve body 201 between PRV inlet 202 and PRV outlet 204, such that the pressure of the fluid in pressure chamber 226 remain independent of any pressure fluctuations upstream or downstream of restricting element 212 (e.g., pressure fluctuations in main circuit 102 or branch circuit 104, 106, 108 (FIG. 1)).

Energy accumulator 232 may be in fluid communication with pressure chamber 226, such that when pressurizing valve 228 enables a flow into pressure chamber 226 to increase the pressure in pressure chamber 226, the increased pressure acts on energy accumulator 232 causing energy accumulator 232 to generate the stored energy. For example, as depicted in the example of FIG. 2, energy accumulator 232 may be vessel (e.g., a bladder) configured to establish a gas-fluid interface 254 between a gas 255 (e.g., air) and a liquid 256 (e.g., water). PRV 200 may be configured such that, when a pressure in pressure chamber 226 increases (e.g., by using pressurizing valve 228 to enable a flow from high pressure side 216 to pressure chamber 226), the fluid communication between energy accumulator 232 and pressure chamber 226 causes some amount of the pressurizing fluid to surge into energy accumulator 232 and compress gas 255, increasing the pressure of gas 255 and storing some portion of the fluid energy in the form of a gas compression. In other examples, energy accumulator 232 may be configured to store energy using other physical phenomena, such as the compression of a spring, substantially elastic deformation of a material, and/or others.

Energy accumulator 232 is configured to exert a pressure on a fluid within pressure chamber 226 using the stored energy. For example, energy accumulator 232 may be configured to exert the pressure when pressure chamber 226 is fluidly isolated from high pressure side 216 and low pressure side 218. The exertion of pressure by energy accumulator 232 may enable a greater range of volumetric expansion and/or contraction of pressure chamber 226 (due to, e.g., movement of sensing element 220) than might be available in the absence of energy accumulator 232. For example, in the absence of energy accumulator 232, and when the fluid utilized to pressurize pressure chamber 226 is a substantially incompressible liquid such as water, the available volumetric expansion or contraction of pressure chamber 226 would be expected to be particularly limited due to the incompressibility of the liquid. PRV 200, using energy accumulator 232, is configured to enable a greater range of volumetric expansion and/or contraction of pressure chamber 226 when, for example, the fluid pressurizing pressure chamber 226 is substantially incompressible (e.g., water). The greater range of expansion and/or contraction of pressure chamber 226 enabled by energy accumulator 232 enables a greater range of motion for sensing element 220, allowing PRV 200 to operate with greater sensitivity.

Energy accumulator 232 is further configured to enable PRV 200 to discharge fluid from pressure chamber 226 in order to decrease a pressure setpoint of PRV 200. For example, when control circuitry 242 controls venting valve 230 to open to enable a flow out of pressure chamber 226, energy accumulator 232 is configured to maintain the pressure to drive the fluid out of pressure chamber 226. In an example, energy accumulator 232 is configured to expend some portion of its stored energy as energy accumulator 232 drives fluid out of pressure chamber 226. Hence, PRV 200 may be configured to reduce pressure in pressure chamber 226 from a first pressure where energy accumulator 232 has a first stored energy to a second pressure where energy accumulator has a second stored energy, where the second pressure is less than the first pressure and the second stored energy is less than the first stored energy. PRV 200 may be configured to utilize the second stored energy of energy accumulator 232 to substantially maintain the second pressure in pressure chamber 226 when pressure chamber 226 is fluidly isolated from high pressure side 216 and low pressure side 218.

Thus, pressure chamber 226 is configured to receive a fluid having a fluid energy and deliver a first portion of the fluid energy to sensing element 220 and deliver a second portion of the fluid energy to energy accumulator 232. For example, pressure chamber 226 may deliver the first portion of the fluid energy to sensing element 220 by exerting the force F1 on sensing element 220 using the pressure of the fluid in pressure chamber 226. Pressure chamber 226 may deliver the second portion of the fluid energy to energy accumulator 232 by, for example, compressing gas 255 or an elastic member (e.g., a spring) using the pressure of the fluid in pressure chamber 226. Pressure chamber 226 may comprise any portion of PRV 200. In examples, pressure chamber 226 comprises some portion of valve bonnet 240. In other examples, pressure chamber 226 is a substantially inseparable portion of valve body 201.

As discussed, PRV 200 is configured to increase or decrease the pressure of the fluid within pressure chamber 226 in order to increase or decrease the pressure setpoint. In the example shown in FIG. 2, control circuitry 242 is configured to increase the pressure in pressure chamber 226 by partially or fully opening pressurizing valve 228. Pressurizing valve 228 is configured to enable a fluid to flow into pressure chamber 226 from a point upstream of restricting element 212 (e.g., substantially from PRV inlet 202, high pressure side 216, or a main branch supplying PRV 200). In examples, PRV 200 includes an inlet conduit 236 in fluid communication with high pressure side 216, and when pressurizing valve 228 is in an open state, pressurizing valve 228 is configured to establish fluid communication between high pressure side 216 of PRV 200 and pressure chamber 226 through inlet conduit 236. In examples, pressurizing valve 228 is configured to fluidly isolate pressure chamber 226 from at least high pressure side 216 of PRV 200. For example, control circuitry 242 may partially or fully open pressurizing valve 228 to allow a fluid to flow into pressure chamber 226 (e.g., from high pressure side 216) to increase a fluid pressure in pressure chamber 226, then pressurizing valve 228 may be shut once the fluid pressure increases to a certain level, in order to fluidly isolate pressure chamber 226 from high pressure side 216.

Control circuitry 242 may be configured to decrease the pressure in pressure chamber 226 using venting valve 230. Venting valve 230 is configured to enable a fluid to discharge from pressure chamber 226 to a point downstream of restricting element 212 (e.g., substantially to PRV outlet 204, low pressure side 218, or a branch circuit supplied by PRV 200). In examples, PRV 200 includes an outlet conduit 238 in fluid communication with low pressure side 218, and venting valve 230 is configured to establish fluid communication between low pressure side 218 of PRV 200 and pressure chamber 226 through outlet conduit 238. In examples, venting valve 230 is configured to fluidly isolate pressure chamber 226 from at least low pressure side 218 of PRV 200. For example, control circuitry 242 may partially or fully open venting valve 230 to allow a fluid to discharge from pressure chamber 226 (e.g., to low pressure side 218) to decrease a fluid pressure in pressure chamber 226, and shut venting valve 230 once the fluid pressure decreases to a certain level, in order to fluidly isolate pressure chamber 226 from low pressure side 218.

In some examples, control circuitry 242 is configured to alter a pressure of the fluid within pressure chamber 226 based on a comparison of a pressure downstream of restricting element 212 and a pressure setpoint, which can be predetermined and stored in a memory accessible by control circuitry 242. In some examples, control circuitry 242 of PRV 200 or otherwise in communication with PRV 200 is configured to receive a signal indicative of a pressure downstream of restricting element 212 (e.g., in low pressure side 218), and determine a downstream pressure based on the received signal. Control circuitry 242 is configured to compare the downstream pressure and a pressure setpoint and increase or decrease a pressure in pressure chamber 226 based on the comparison. Control circuitry 242 may be configured to increase the pressure by causing pressurizing valve 228 to enable a fluid having a fluid energy to flow into pressure chamber 226. In an example, control circuitry 242 causes pressurizing valve 228 to enable a flow from high pressure side 216 to pressure chamber 226. Control circuitry 242 may be configured to decrease the pressure by causing venting valve 230 to enable a fluid to discharge from pressure chamber 226. In an example, control circuitry 242 causes venting valve 230 to enable the fluid to discharge from pressure chamber 226 to low pressure side 218. In an example, control circuitry 242 is configured to increase and/or decrease the pressure in pressure chamber 226 until the downstream pressure is within a specified tolerance of the setpoint pressure. For example, control circuitry 242 may increase and/or decrease the pressure in pressure chamber 226 until the downstream fluid pressure within at least 1% to about 30% of the setpoint pressure, such as at within about 1%, 5%, 10%, 20%, or 30% of the setpoint pressure.

In some examples, control circuitry 242 is configured to communicate with pressurizing valve 228 and direct (e.g., control directly or indirectly) pressurizing valve 228 to enable the flow of the fluid into pressure chamber 226. Control circuitry 242 may communicate with pressurizing valve 228 using, for example, communication link 244. Control circuitry 242 may communicate with pressurizing valve 228 in order to increase the pressure of a fluid in pressure chamber 226 to increase the pressure setpoint of PRV 200. In some examples, control circuitry 242 is configured to communicate with venting valve 230 and direct (e.g., control directly or indirectly) venting valve 230 to enable a fluid to discharge from pressure chamber 226. Control circuitry 242 may communicate with venting valve 230 using, for example, communication link 246. Control circuitry 242 may communicate with venting valve 230 in order to decrease the pressure of a fluid in pressure chamber 226 to decrease the pressure setpoint of PRV 200.

Control circuitry 242 may determine a pressure using any suitable technique. In some examples, control circuitry 242 is configured to receive a pressure signal generated by a pressure sensor such as pressure sensor 248 configured to sense a pressure indicative of a pressure downstream of restricting element 212 (e.g., in low pressure side 218). Control circuitry 242 may be configured to receive the pressure signal from an outlet pressure sensor 248 via communication link 250.

In some examples, control circuitry 242 may be provided with one or more pressure setpoints, e.g., a revised setpoint, via a communication from another device or via a user interface of control circuitry 242. The user interface can have any suitable configuration. For example, the user interface can include a button or keypad, a speaker configured to receive voice commands from a user, a display, such as a liquid crystal (LCD), light-emitting diode (LED), or organic light-emitting diode (OLED). In some examples the display may be a touch screen. The user interface is configured to receive user input, e.g., in the form of pressing one or more buttons on a keypad or via a touch screen, which may be user input selecting a desired pressure setpoint, for example. In some examples, the user interface is also configured to display information, such as one or more pressure setpoints (e.g., the current setpoint being used by control circuitry 242 to control PRV 200 or one or more predetermined pressure setpoints from which the user can select to input a desired pressure setpoint). The other device can be a device configured to communicate with control circuitry 242 via any suitable wireless or wired communication techniques. The device can be, for example, a tablet computer, a mobile phone, or the like, with which a user can interact to remotely modify the one or more pressure setpoints with which control circuitry 242 controls PRV 200.

In some examples, control circuitry 242 may be configured to establish a desired setpoint based on a particular criteria. For example, control circuitry 242 may be configured to establish a revised setpoint based on a time of day, a scheduled operation requiring or anticipated to require a particular fluid demand from PRV 200, and/or the actuation of a specific fluid load supplied by PRV 200.

In some examples, control circuitry 242 is configured to recognize a condition under which PRV 200 should close and, in response, open venting valve 230 to reduce the pressure in pressure chamber 226. For example, control circuitry 242 may receive a leak signal from a leak detection system monitoring a fluid branch downstream of PRV 200. For example, PRV 200 may be PRV 110 (FIG. 1). A leak detection system 164 (FIG. 1) might be configured to detect fluid leakage from branch circuit 104 (e.g., at or near fluid load 112 (FIG. 1)) and control circuitry of PRV 110 may be configured to receive a leak signal from leak detection system 164. Control circuitry 242 may be configured such that, in response to receiving the leak signal, control circuitry 242 causes venting valve 230 open and reduce the pressure in pressure chamber 226 to a level where sensing element 220 causes restricting element 212 to translate and close PRV 200, thereby eliminating (to the extent possibly by the fluid seals of PRV 200) fluid flow through PRV. In this way, PRV 200 can be configured to automatically shut off in response to certain detected conditions, such as a fluid leak.

Valves 228, 230 can have any suitable configuration. In some examples, pressurizing valve 228 and/or venting valve 230 is a proportional control valve. In other examples, pressurizing valve 228 and/or venting valve 230 is a direct control valve. Pressurizing valve 228 and/or venting valve 230 may be a globe valve, a gate valve, a spool valve, a poppet valve, or any other type of valve mechanism which may be configured to control a flow path from an inlet to an outlet. In an example, pressurizing valve 228 and/or venting valve 230 is a portion of a three-way valve (e.g., three-way valve 291 (FIG. 4)).

Figure 3:
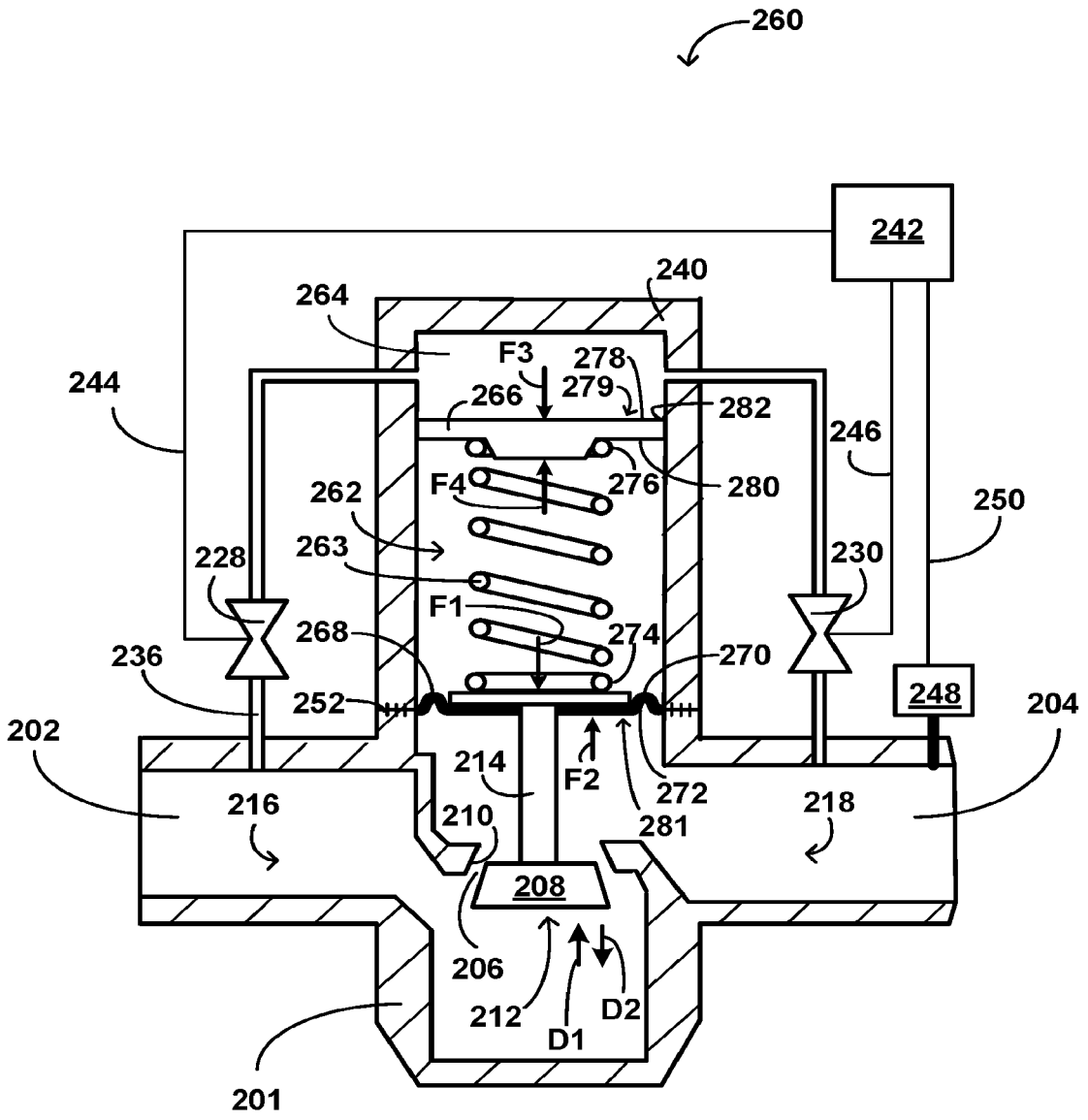
FIG. 3 is a conceptual diagram illustrating an example pressure regulating valve including a three-way valve.

FIG. 3 illustrates an example PRV 260 including an energy accumulator 262 and a pressure chamber 264. Energy accumulator 262 includes spring 263. PRV 260 further includes valve body 201, PRV inlet 202, PRV outlet 204, valve seat 210, restricting element 212 including valve stem 214 and valve disc 208, high pressure side 216, low pressure side 218, pressurizing valve 228, venting valve 230, inlet conduit 236, outlet conduit 238, valve bonnet 240, control circuitry 242, communication link 244, communication link 246, outlet pressure sensor 248, communication link 250, and threads 252, which may be configured similarly to and operate relative to other PRV 260 components in the same manner as the like-named components of PRV 110, PRV 130, PRV 144, PRV 146, PRV 148, PRV 150, and/or PRV 200. PRV 260 is an example of any of PRV 110, PRV 130, PRV 144, PRV 146, PRV 148, PRV 150, and/or PRV 200. PRV 260 is an example of PRV 110, 130, 144, 146, 148, 150 of FIG. 1

Sensing element 268 includes first side 270 and second side 272. Sensing element 268 is configured to move (e.g., by deflection of a diaphragm or translation of a piston) and modify the position of restricting element 212 based on a difference between a force (e.g., F1) acting on first side 270 and a force (e.g., F2) acting on second side 272. Motion of sensing element 220 causes motion of restricting element 212 and adjustment of flow area 206. Sensing element 268 may be configured to receive the force F1 from spring 263. For example, spring 263 may exert the force F1 in the direction shown in FIG. 3 due to a compression of spring 263. Second side 272 of sensing element 268 is configured such that a fluid within low pressure side 218 of PRV 200 exerts the force F2 on second side 272. Sensing element 268 is configured such that the force F2 on second side 272 at least partially opposes the force F1 on first side 270. In examples, sensing element 268 is configured such that second area 282 is in fluid communication with the flow path between PRV inlet 202 and PRV outlet 204, such as some portion of low pressure side 218. Sensing element 268, first side 270, and second side 272 may be an example of sensing element 220, first side 222, and second side 224 (FIG. 2) respectively of PRV 200. Thus, PRV 260 is configured such that a force differential between the force F1 and the force F2 causes movement of sensing element 268 and adjustment of flow area 206, and an adjustment of a pressure of a fluid supplied to a branch circuit by PRV outlet 204.

Energy accumulator 262 is configured to generate stored energy using some portion of the fluid energy of a fluid within pressure chamber 264. Energy accumulator 262 may include an elastic member, (e.g., spring 263) configured to store energy when the elastic member is in a compressed state. Energy accumulator 262 may be configured to compress the elastic member (e.g., spring 263) using some portion of a fluid energy within pressure chamber 264, in order to store at least a portion of the fluid energy within pressure chamber 264. For example, in the example of FIG. 3, energy accumulator 262 includes spring 263 and spring plate 266. Spring 263 is configured to be compressed between spring plate 266 and sensing element 268. Spring 263 includes a first end 274 ("spring first end 274") coupled to sensing element 268 and a second end 276 ("spring second end 276") coupled to spring plate 266. Energy accumulator 262 may be configured to translate spring plate 266 using fluid energy within pressure chamber 264, generating a compression of spring 263 between spring first end 274 and spring second end 276, and thus causing spring 263 to store energy using the fluid energy within pressure chamber 264.

Spring plate 266 may be configured to move (e.g., by deflection of a diaphragm or translation of a piston) based on a difference between a force (e.g., F3) acting on a first side 278 of spring plate 266 ("plate first side 278") and a force (e.g., F4) acting on a second side 280 of spring plate 266 ("plate second side 280"). Spring plate 266 may be configured such that a pressure of a fluid within pressure chamber 264 causes the force F3 on plate first side 278. Spring plate 266 may be configured such that spring second end 276 causes the force F4 on plate second side 280. Spring plate 266 is configured such the force differential (e.g., between F3 and F4) causes spring plate 266 to move and cause motion of at least spring second end 276. For example, when force F3 exceeds force F4 (e.g., due to pressurizing pressure chamber 264 via pressurizing valve 228), spring plate 266 may move in the direction D2, causing spring second end 276 to move in the direction D2. Movement in the direction D2 may decrease a displacement between spring second end 276 and spring first end 274, causing a compression of spring 263. Thus, spring plate 266 may be configured such that an increase in a fluid pressure in pressure chamber 264 causes an increase in the force F3, causing spring plate 266 to move in the direction D2 and compress spring 263, such that spring 263 stores some portion of the fluid energy causing the increased pressure in pressure chamber 264.

PRV 260 may be configured to position restricting element 212 using a first portion of a fluid energy introduced into pressure chamber 264 and cause energy accumulator 262 to generate stored energy using a second portion of the fluid energy introduced into pressure chamber 264. For example, increasing the pressure in pressure chamber 264 (e.g., by enabling a flow into pressure chamber 264 using pressurizing valve 228) may increase a force (e.g., F3) acting on plate first side 278 of spring plate 266. The increased force on plate first side 278 may cause movement of spring plate 266 (e.g., in the direction D2), causing spring second end 276 to move in the direction D2. Spring 276 may react by compressing and storing some portion of the fluid energy introduced to pressure chamber 264 to increase the pressure. The compression of spring 276 may cause an increase in the force F4 exerted on spring plate 266 by spring second end 276, and an increase in the force F1 exerted on sensing element 268 by spring first end 274. The increased force F1 may cause sensing element 268 to move restricting element 212 in a direction increasing flow area 206 (e.g., in the direction D2), decreasing a pressure drop across restricting element 212 and increasing the pressure within low pressure side 218.

PRV 260 may continue to increase flow area 206 until the force F2 (caused by fluid in low pressure side 218) is substantially equal to the force F1 (driven by the compression of spring 263 caused by the pressure in pressure chamber 264). Thus, PRV 260 may be configured such that an increase in the pressure of a fluid within pressure chamber 264 causes sensing element 268 to position restricting element 212 using a first portion of the fluid energy introduced to pressure chamber 264 (e.g., that portion which causes the displacement of spring first end 274), and causes energy accumulator 262 to generate stored energy using a second portion of the fluid energy introduced to pressure chamber 264 (e.g., that portion which causes a compression or increased compression of spring 263).

Energy accumulator 262 may be configured to exert a pressure on the fluid within pressure chamber 264. For example, energy accumulator 262 may be configured to exert the pressure using the elastic member (e.g., spring 263). Energy accumulator 262 may be configured such that, when the elastic member (e.g., spring 263) is compressed, the elasticity of the elastic member causes energy accumulator 262 to exert the pressure on the fluid within pressure chamber 264. For example, spring 263 may be configured to exert a force (e.g., F4) on plate second side 280, causing plate first side 278 to exert the pressure on the fluid in pressure chamber 264.

In examples, energy accumulator 262 is configured to exert the pressure on the fluid within pressure chamber 264 when the elastic member (e.g., spring 263) expands from a compressed state. For example, when force F3 decreases (e.g., due to venting a fluid from pressure chamber 264 via venting valve 230) such that force F4 exceeds force F3, spring 263 may expand, increasing a displacement between spring first end 274 and spring second end 276. The increased displacement may cause spring plate 266 to move in the direction D1, causing plate first side 278 to exert the pressure on the fluid in pressure chamber 264 as venting of pressure chamber 264 continues and once venting ceases. The exertion of pressure on pressure chamber 264 by energy accumulator 262 may allow fluid in pressure chamber 264 to vent to low pressure side 218 or some other point downstream of restricting element 212.

In some examples, PRV 260 may be configured such that the expansion of spring 263 causes a decrease in the pressure of the fluid within pressure chamber 264. For example, the expansion of spring 263 (e.g., when spring plate 266 moves in the direction D1) may cause a decrease in the force F4 exerted on spring plate 266 by spring second end 276, decreasing the pressure of the fluid in pressure chamber 264. In some examples, the expansion of spring 263 may further cause a decrease in the force F1 exerted on sensing element 268 by spring first end 274. The decreased force F1 may cause sensing element 268 to move restricting element 212 in a direction decreasing flow area 206 (e.g., in the direction D1), increasing a pressure drop across restricting element 212 and decreasing the pressure within low pressure side 218 and decreasing the force F2. PRV 260 may continue to decrease flow area 206 until the force F2 (caused by fluid in low pressure side 218) is substantially equal to the force F1 (driven by the compression of spring 263 caused by the pressure in pressure chamber 264).

Thus, PRV 260 may be configured such that alterations to the pressure of a fluid within pressure chamber 264 can alter a pressure setpoint of PRV 260. For example, as discussed above, increasing the pressure in pressure chamber 264 (e.g., using pressurizing valve 228 to enable a flow into pressure chamber 264) may cause spring plate 266 to displace in the direction D2 and cause PRV 260 to position restricting element 212 such that the pressure of a fluid in low pressure side 218 increases. Decreasing the pressure in pressure chamber 264 (e.g., using venting valve 230 to enable a discharge of fluid from pressure chamber 264) may cause spring plate 266 to displace in the direction D1 and cause PRV 260 to position restricting element 212 such that the pressure of a fluid in low pressure side 218 decreases.

In examples, PRV 260 is configured such that the force on first side 270 of sensing element 268 (e.g., F1) is substantially equal to the force on second side 272 (e.g., F2) when a pressure in pressure chamber 264 is greater than a pressure in low pressure side 218. For example, plate first side 278 may include a pressure area 279 in fluid communication with pressure chamber 264 and sensing element 268 may include second area 281 in fluid communication with a fluid in low pressure side 218. In some examples, PRV 260 may be configured such that pressure area 279 is less than second area 281, such that the forces F3 and F1 may be substantially equal to the force F2 when a pressure in pressure chamber 226 is greater than a pressure in low pressure side 218. In some examples, spring 263 may be configured such that the force F1 may be substantially equal to the force F2 when a pressure in pressure chamber 264 is greater than a pressure in low pressure side 218. For example, spring 263 may have a spring constant such that, when the force F1 is substantially equal to the force F2, the pressure in pressure chamber 264 is greater than the pressure in low pressure side 218. The higher pressure in pressure chamber 264 may enable PRV 260 to discharge the fluid from pressure chamber 264 to PRV outlet 204, low pressure side 218, or a point downstream of restricting element 212.

In some examples, pressure chamber 264 is defined or surrounded at least in part by valve body 201 and/or valve bonnet 240 of PRV 260. In examples, pressure chamber 226 is defined or surrounded at least in part by spring plate 266. Pressure chamber 264 may comprise a volume surrounded by a substantially gas-tight (e.g., gas-tight or gas-tight to the extent permitted by manufacturing tolerances) boundary. The volume may have any suitable shape. PRV 260 is configured such that movement of spring plate 266 may cause pressure chamber 264 to expand (e.g., increase its volume) or contract (e.g., decrease its volume). Pressure chamber 264 is an example of pressure chamber 226 (FIG. 2).

Spring plate 266 may define a perimeter 282 surrounding at least a portion of spring plate 266. Spring plate 266 may be mechanically coupled and/or fixably attached to body 201 and/or valve bonnet 240 around all or some part of perimeter 282. For example, spring plate 266 may be a particular diaphragm defining a perimeter 282 and fixably attached around the entirety of perimeter 282. As another example, spring plate 266 may be a piston with perimeter 221 slidably translatable over some portion of body 201 and/or valve bonnet 240. Plate first side 278 may be configured to receive a force (e.g., F3) caused at least in part by a pressurized fluid within pressure chamber 264. In examples, plate first side 278 is in fluid communication with pressure chamber 264. PRV 260 may be configured such that plate first side 278 is fluidly isolated from those portions of valve body 201 configured to be in fluid communication with a fluid flowing from PRV inlet 202 to PRV outlet 204.

Figure 4:
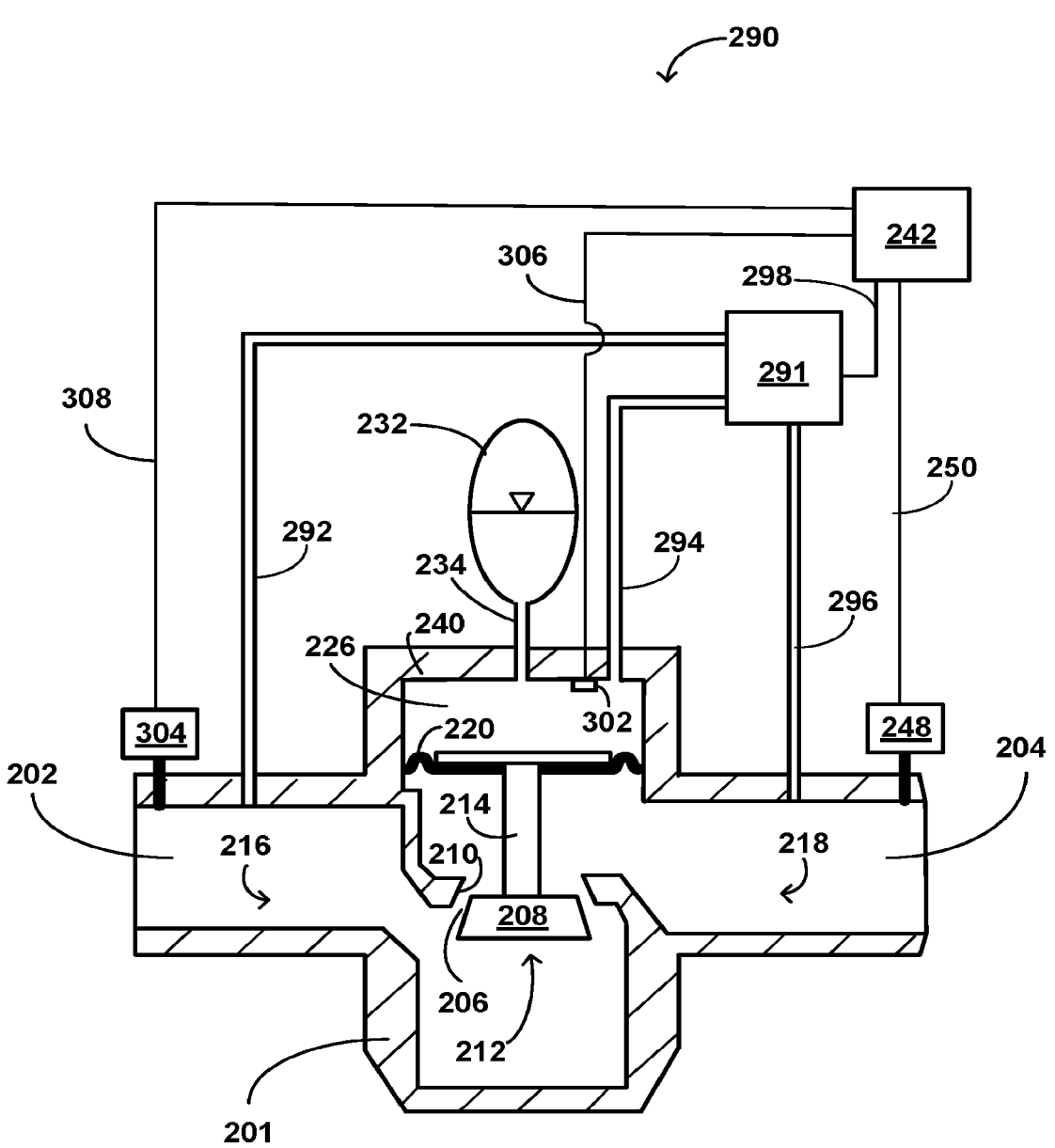
FIG. 4 is a conceptual diagram illustrating an example pressure regulating valve including a spring member.

FIG. 4 illustrates another example PRV 290. PRV 290 includes valve body 201, PRV inlet 202, PRV outlet 204, restricting element 212 including valve stem 214 and valve disc 208, high pressure side 216, low pressure side 218, sensing element 220, pressure chamber 226, energy accumulator 232, conduit 234, valve bonnet 240, control circuitry 242, outlet pressure sensor 248, and communication link 250, which may be configured similarly to and operate relative to other PRV 260 components in the same manner as the like-named components of PRV 110, PRV 130, PRV 144, PRV 146, PRV 148, PRV 150, PRV 200, and/or PRV 260. PRV 260 is an example of any of PRV 110, PRV 130, PRV 144, PRV 146, PRV 148, PRV 150, PRV 200, and/or PRV 260.

PRV 290 includes a three-way valve 291 configured to enable a fluid to flow into pressure chamber 226 and configured to enable a fluid within pressure chamber 226 to discharge from pressure chamber 226. Three-way valve 291 may have a first position enabling the flow into pressure chamber 226 and, in some examples, preventing fluid flow out of chamber 226. For example, the first position may enable a flow substantially from PRV inlet 202, high pressure side 216, and/or a position upstream of restricting element 212. The first position may enable a flow path (e.g., establish fluid communication) between an inlet conduit 292 and a pressure chamber conduit 294, such that a fluid may flow from PRV inlet 202, high pressure side 216, and/or the position upstream of restricting element 212 into pressure chamber 226 using inlet conduit 292 and pressure chamber conduit 294. Three-way valve 291 may be configured such that the first position fluidly isolates pressure chamber 226 from PRV outlet 204, low pressure side 218, and/or the position downstream of restricting element 212. For example, the first position may fluidly isolate pressure chamber 226 from an outlet conduit 296 in fluid communication with PRV outlet 204, low pressure side 218, and/or the position downstream of restricting element 212.

Three-way valve 291 may have a second position enabling a fluid in pressure chamber 226 to discharge from pressure chamber 226, and, in some examples, preventing fluid flow into of pressure chamber 226. For example, the second position may enable a fluid in pressure chamber 226 to discharge to PRV outlet 204, low pressure side 218, and/or a position downstream of restricting element 212. The second position may enable a flow path (e.g., establish fluid communication) between pressure chamber conduit 294 and outlet conduit 296, such that a fluid may discharge from pressure chamber 226 and to PRV outlet 204, low pressure side 218, and/or the position downstream of restricting element 212 from pressure chamber 226 using pressure chamber conduit 294 and outlet conduit 296. Three-way valve 291 may be configured such that the second position fluidly isolates pressure chamber 226 PRV inlet 202, high pressure side 216, and/or a position upstream of restricting element 212. For example, the second position may fluidly isolate pressure chamber 226 from inlet conduit 292.

In some examples, three-way valve 291 is configured to fluidly isolate pressure chamber 226 from PRV inlet 202, high pressure side 216, and/or a position upstream of restricting element 212, and from PRV outlet 204, low pressure side 218, and/or a position downstream of restricting element 212. For example, three-way valve 291 may have a third position configured to fluidly isolate pressure chamber 226 from inlet conduit 292 and outlet conduit 296.

In some examples, control circuitry 242 is configured to communicate with three-way valve 291 and direct (e.g., control directly or indirectly) three-way valve 291 to enable the flow of the fluid into pressure chamber 226. Control circuitry 242 may be configured to communicate with three-way valve 291 and direct three-way valve 291 to enable a fluid to discharge from pressure chamber 226. Control circuitry 242 may communicate with three-way valve 291 using, for example, communication link 298.

Control circuitry 242 may be configured to increase the pressure in pressure chamber 226 by causing three-way valve 291 to establish the first position and enable a flow into pressure chamber 226 (e.g., from PRV inlet 202, high pressure side 216, and/or a position upstream of restricting element 212). Control circuitry 242 may be configured to decrease the pressure by causing three-way valve 291 to establish the second position and enable a fluid to discharge from pressure chamber 226 (e.g., to PRV outlet 204, low pressure side 218, and/or a position downstream of restricting element 212). Control circuitry 242 may be configured to increase and/or decrease the pressure of the fluid within pressure chamber 226 based on a signal indicative of a pressure received from outlet pressure sensor 248

In some examples, PRV 290 includes a chamber pressure sensor 302 and/or an inlet pressure sensor 304. Chamber pressure sensor 302 may be configured to sense a pressure within pressure chamber 226. Inlet pressure sensor 304 may be configured to sense a pressure at PRV inlet 202, within high pressure side 216, or at a position upstream of restricting element 212. Control circuitry 242 may be configured to increase and/or decrease the pressure of the fluid within pressure chamber 226 based on a signal indicative of a pressure received from chamber pressure sensor 302 and/or inlet pressure sensor 304. Control circuitry 242 may be configured to receive the signal from chamber pressure sensor 370 via communication link 306 and/or configured to receive the signal from chamber pressure sensor 370 via communication link 308.

Outlet pressure sensor 248, chamber pressure sensor 302, and/or inlet pressure sensor 304 ("sensors 248, 302, 304") may be located adjacent to or within some enclosure defined by valve body 201, or may be within a sensor housing configured to remain substantially separate from valve body 201. Sensors 248, 302, 304 may be configured to generate a signal as a function of a pressure imposed on some portion of sensors 248, 302, 304. Sensors 248, 302, 304 may be configured to use any type of force collector to sense the outlet pressure, including, for example, diaphragms, pistons, bourdon tubes, bellows, or some other collector. Sensors 248, 302, 304 may transduce the pressure into an electrical signal using, for example, piezoresistive strain gauges, capacitors, electromagnets, optical fibers, potentiometric wipers, or other devices. Sensors 248, 302, 304 may be configured to sense an absolute pressure or a gauge pressure.

Signals indicative of a pressure generated by sensors 248, 302, 304 may be an analog electrical signal or a digital signal. In some examples, sensors 248, 302, 304 may include processing circuitry configured to interpret a response of its respective force collector and generate the signal indicative of the pressure, and/or control circuitry 242 may be configured to interpret a response of the respective force collector and generate the signal indicative of the pressure. Sensors 248, 302, 304 may be configured to provide a signal indicative of the pressure to other devices in data communication with outlet pressure sensor 248.

Control circuitry 242, as well as other control circuitry described herein, can comprise any suitable arrangement of hardware, software, firmware, or any combination thereof, to perform the techniques attributed to control circuitry 242 herein. For example, control circuitry 242 may include any one or more microprocessors, digital signal processors (DSPs), application specific integrated circuits (ASICs), field programmable gate arrays (FPGAs), or any other equivalent integrated or discrete logic circuitry, as well as any combinations of such components. Control circuitry 242 may be located adjacent to or within some enclosure defined by valve body 201, or may be within a controller housing configured to remain separate from valve body 201. Additionally, control circuitry 242 may be configured to adjust a pressure in a pressure chamber for other PRVs in addition to PRV 200

Communication link 244, communication link 246, communication link 250, communication link 298, communication link 306, and/or communication link 308 ("communication links 244, 246, 250, 298, 306, 308") as well as other communication links described herein, may be hard-line and/or wireless communications links. In some examples, communication links 244, 246, 250, 298, 306, 308 may comprise some portion of control circuitry 242. Communication links 244, 246, 250, 298, 306, 308 may comprise a wired connection, a wireless Internet connection, a direct wireless connection such as wireless LAN, Bluetooth™, Wi-Fi™, and/or an infrared connection. Communication links 244, 246, 250, 298, 306, 308 may utilize any wireless or remote communication protocol.

Pressuring valve 228, venting valve 230, and/or three-way valve 291 ("one or more valves 228, 230, 291") may each be any suitable valves, such as, but not limited to, globe valve, a gate valve, a spool valve, a poppet valve, or any other type of valve mechanism which may be configured to control a flow path from an inlet to an outlet. In some examples, one or more valves 228, 230, 291 may be a remotely actuated valve. In some examples, one or more valves 228, 230, 291 comprises a solenoid actuator configured to influence the position of a plunger mechanically coupled to a flow restricting element, such as a valve disc. One or more valves 228, 230, 291 may configured to translate a flow restricting element based on a supply of a control fluid. For example, one or more valves 228, 230, 291 may be a hydraulically or pneumatically operated valve. One or more valves 228, 230, 291 may include processing circuitry configured to control components of one or more valves 228, 230, 291 in response to a received electrical or electronic communication. The processing circuitry can be provided by control circuitry 242 or be separate from control circuitry 242. One or more valves 228, 230, 291 may be configured to provide communications to other devices in data communication with one or more valves 228, 230, 291. Control circuitry 242 may direct one or more valves 228, 230, 291 to fully or partially open, and may one or more valves 228, 230, 291 to fully or partially close.

Figure 5:
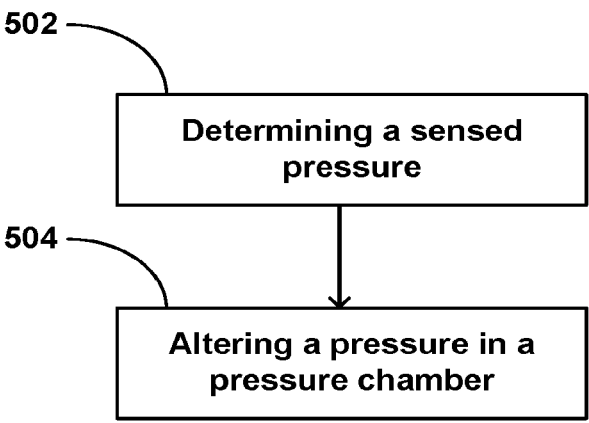
FIG. 5 is a flow diagram illustrating an example technique for controlling a pressure in a fluid circuit.

FIG. 5 illustrates a flow diagram of an example technique for regulating a pressure. Although the technique is mainly described with reference to PRV 200 (FIG. 2), PRV 260 (FIG. 3), and/or PRV 290 (FIG. 4), in other examples, the technique may be used with PRV 110, PRV 130, PRV 144, PRV 146, PRV 148, and/or PRV 150 of FIG. 1 or another PRV described herein. In addition, control circuitry 242 alone or in combination with control circuitry of other devices can perform any part of the technique shown in FIG. 5

In accordance with the technique shown in FIG. 5, control circuitry 242 determines a sensed pressure based on a signal from a pressure sensor such as pressure sensor 248, 302, 304 (502). In examples, control circuitry 242 communicates with sensors 248, 302, 304 using communication links 250, 306, 308. Control circuitry 242 may compare the sensed pressure and a pressure setpoint. Control circuitry 242 can be provided with the pressure setpoint via a communication from another device or via a user interface of control circuitry 242. In some examples, control circuitry 242 establishes the pressure setpoint based on a particular criteria, such as time of day, a scheduled operation requiring or anticipated to require a particular fluid demand from PRV 200, 260, 290, and/or the actuation of a specific fluid load supplied by PRV 200, 260, 290.

Control circuitry 242 alters a pressure in a pressure chamber pressure chamber 226, 264 of a PRV 200, 260, 290 based on the comparison of the sensed pressure and the pressure setpoint (504). Control circuitry 242 may increase the pressure in pressure chamber 226, 264 by causing pressurizing valve 228 and/or three-way valve 291 to enable a fluid having a fluid energy to flow to pressure chamber 226, 264. In examples, control circuitry 242 causes pressurizing valve 228 and/or three-way valve 291 to open or partially open to enable the fluid to flow to pressure chamber 26, 264. Pressurizing valve 228 and/or three-way valve 291 are configured to enable a fluid having the fluid energy to flow to pressure chamber 226, 264. Pressurizing valve 228 and/or three-way valve 291 may establish fluid communication between pressure chamber 226, 264 and PRV inlet 202, high pressure side 216, and/or a point upstream of restricting element 212. Control circuitry 242 may communicate using communication link 244, 298 and cause pressurizing valve 228 and/or three-way valve 291 to open or partially open to enable the fluid having the fluid energy to flow to pressure chamber 226, 264. Control circuitry 242 may be configured to increase a pressure in pressure chamber 226, 264 using pressurizing valve 228 and/or three-way valve 291 until a pressure sensed by sensors 248, 302, 304 indicates a specific pressure or a pressure value within a specified range.

Control circuitry 242 may decrease the pressure in pressure chamber 226, 264 by causing venting valve 230 and/or three-way valve 291 to enable the fluid to discharge from pressure chamber 226, 264. In examples, control circuitry

242 causes venting valve 230 and/or three-way valve 291 to open or partially open to enable the fluid to discharge from pressure chamber 26, 264. Venting valve 230 and/or three-way valve 291 are configured to discharge the fluid from pressure chamber 226, 264 . . . . PRV 200, 260, 290 may discharge the fluid from pressure chamber 226, 264, 290 to PRV outlet 204, low pressure side 218, and/or a point downstream of restricting element 212. PRV 200, 260, 290 may include venting valve 230 and/or three-way valve 291 configured to discharge the fluid from pressure chamber 226, 264. Venting valve 230 and/or three-way valve 291 may establish fluid communication between pressure chamber 226, 264 and PRV outlet 204, low pressure side 218, and/or the point downstream of restricting element 212. Control circuitry 242 may communicate using communication link 246, 298 and cause venting valve 230 and/or three-way valve 291 to open or partially open to enable the fluid having the fluid energy to discharge from pressure chamber 226, 264. Control circuitry 242 may be configured to decrease a pressure in pressure chamber 226, 264 using venting valve 230 and/or three-way valve 291 until a pressure sensed by sensors 248, 302, 304 indicates a specific pressure or a pressure value within a specified range.

In examples, the technique includes delivering a first portion of the fluid energy to a sensing element 220, 268. PRV 200, 260, 290 includes a pressure chamber 226, 264 is configured to deliver the first portion of the fluid energy to sensing element 220, 268 and configured to cause the first portion of the fluid energy to generate a force (e.g., F1) acting on first side 222, 270 of sensing element 220, 268. Sensing element 220, 268 is configured to move (e.g., by deflection of a diaphragm or translation of a piston) and modify the position of restricting element 212 based on a difference between the force (e.g., F1) on first side 222, 270 and a force (e.g., F2) acting on second side 224, 272 of sensing element 220, 268. Motion of sensing element 220 causes motion of restricting element 212 and adjustment of flow area 206.

In examples, the technique includes delivering a second portion of the fluid energy to an energy accumulator 232, 262. Pressure chamber 226, 264 is configured to deliver the second portion of the fluid energy to energy accumulator 232, 262. Energy accumulator 232, 262 is configured to generate stored energy using the second portion of the fluid energy. In examples, energy accumulator 232, 262 includes vessel (e.g., a bladder) in fluid communication with pressure chamber 226 and configured to establish gas-fluid interface 254 between gas 255 (e.g., air) and liquid 256 (e.g., water). Pressure chamber 226, 264 may be configured to cause some amount of a fluid flowing to pressure chamber 226, 264 (e.g., via pressurizing valve 228 and/or three-way valve 291) to surge into energy accumulator 232, 262 and compress gas 255 to generate the stored energy. Pressure chamber 226, 264 may be configured to cause some amount of the fluid flowing to pressure chamber 226, 264 to exert a pressure and cause compression of an elastic element such as spring 263 using, for example, spring plate 266. Spring 263 may be configured to compress between a spring plate 266 and sensing element 220, 268. PRV 200, 260, 290 may be configured such that spring 263 uses the first portion of the fluid energy delivered to pressure chamber 226, 264 to displace a spring first end 274 to cause displacement of sensing element 220, 268, and spring 263 uses the second portion of the fluid energy delivered to pressure chamber 226, 264 to cause a compression of spring 263.

In examples, energy accumulator 232, 262 is configured to exert a pressure on a fluid within pressure chamber 226,

264. In examples, energy accumulator 232, 262 is configured to use a pressure of gas 255 to exert the pressure on the fluid within pressure chamber 226, 264. In examples, energy accumulator 232, 262 is configured to use a compression of an elastic element (e.g., spring 263) to exert the pressure on the fluid within pressure chamber 226, 264 via, e.g., plate first side 278 of spring plate 266. In examples, PRV 200, 260, 290 is configured to use the pressure exerted by energy accumulator 232, 262 to enable the fluid to discharge from pressure chamber 226, 264.

The techniques described in this disclosure, including those attributed to control circuitry 242 (FIG. 2) and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICS, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The present disclosure includes the following examples.

Example 1: A valve comprising: a restricting element; a valve body defining a pressure chamber; one or more valves in fluid communication with the pressure chamber, wherein the one or more valves are configured to enable a fluid having a fluid energy to flow to the pressure chamber; a sensing element configured to position the restricting element using a first portion of the fluid energy; and an energy accumulator configured to generate stored energy using a second portion of the fluid energy, wherein the pressure chamber is configured to deliver the first portion of the fluid energy to the sensing element, and wherein the pressure chamber is configured to deliver the second portion of the fluid energy to the energy accumulator.

Example 2: The valve of example 1, wherein the energy accumulator is configured to exert a pressure on a fluid in the pressure chamber using the stored energy.

Example 3: The valve of any combination of examples 1-2, wherein the energy accumulator is configured to generate the stored energy when a pressure in the pressure chamber increases, and wherein the energy accumulator is configured to discharge at least a portion of the stored energy when the pressure in the pressure chamber decreases.

Example 4: The valve of any combination of examples 1-3, further comprising: a valve inlet; and an inlet pressure line between the pressure chamber and the valve inlet, wherein the one or more valves are configured to enable the fluid having the fluid energy to flow to the pressure chamber through the inlet pressure line.

Example 5: The valve of any combination of examples 1-4, wherein the one or more valves are configured to enable a fluid in the pressure chamber to discharge from the pressure chamber.

Example 6: The valve of example 5, wherein the energy accumulator is configured to discharge at least a portion of the stored energy when the one or more valves enable the fluid in the pressure chamber to discharge from the pressure chamber.

Example 7: The valve of any combination of examples 5-6, further comprising: a valve outlet; and an outlet pressure line between the pressure chamber and the valve outlet, wherein the one or more valves are configured to enable the fluid in the pressure chamber to discharge from the pressure chamber through the outlet pressure line.

Example 8: The valve of any combination of examples 1-7, further comprising: a pressure sensor configured to generate a signal indicative of a sensed pressure; and control circuitry configured to: determine the sensed pressure based on the signal, and increase or decrease a pressure in the pressure chamber based on a comparison of the sensed pressure and a pressure setpoint, wherein the control circuitry is configured to: increase the pressure in the pressure chamber by at least causing the one or more valves to enable the fluid having the fluid energy to flow to the pressure chamber; and decrease the pressure in the pressure chamber by at least causing the one or more valves to enable a fluid in the pressure chamber to discharge from the pressure chamber.

Example 9: The valve of any combination of examples 1-8, further comprising a valve body defining a flow path from a valve inlet to a valve outlet, wherein: the pressure chamber is configured to exert a first force in a first direction on the restricting element using a first pressure of a fluid in the pressure chamber, and the sensing element is configured to exert a force in a second direction on the restricting element using a second pressure of a fluid in the flow path.

Example 10: The valve of any combination of examples 1-9, further comprising a valve body defining a flow path from a valve inlet to a valve outlet, wherein: a first area within the valve body and defined at least in part by the sensing element is configured to generate a first force on the restricting element when the first area is in fluid communication with a fluid in the pressure chamber, a second area within the valve body and defined at least in part by the sensing element is configured to generate a second force opposite the first force on the restricting element when the second area is in fluid communication with a fluid in the flow path, and the first area is less than the second area.

Example 11: The valve of any combination of examples 1-10, wherein the one or more valves include a pressurizing valve configured to enable the fluid to flow to the pressure chamber and a venting valve configured to enable the fluid in the pressure chamber to discharge from the pressure chamber.

Example 12: The valve of any combination of examples 1-11, wherein the one or more valves includes a three-way valve having at least a first position and a second position, wherein the three-way valve is configured to enable the fluid to flow to the pressure chamber in the first position and to enable the fluid in the pressure chamber to discharge from the pressure chamber in the second position.

Example 13: The valve of any combination of examples 1-12, wherein the energy accumulator is configured to generate the stored energy by at least compressing a gas using the second portion of the fluid energy.

Example 14: The valve of any combination of examples 1-13, wherein the energy accumulator is configured to generate the stored energy by at least compressing a spring element using the second portion of the fluid energy.

Example 15: A valve comprising: a valve inlet; a valve outlet; a restricting element between the valve inlet and the valve outlet; a valve body defining a pressure chamber; an inlet pressure line between the valve inlet and the pressure chamber; an outlet pressure line between the valve outlet and the pressure chamber; one or more valves in fluid communication with the pressure chamber, wherein the one or more valves are configured to: enable a fluid having a fluid energy to flow from the valve inlet to the pressure chamber through the inlet pressure line, and configured to enable the fluid in the pressure chamber to discharge from the pressure chamber to the valve outlet through the outlet pressure line; a sensing element configured to position the restricting element using a first portion of the fluid energy; and an energy accumulator configured to generate stored energy using a second portion of the fluid energy, wherein: the pressure chamber is configured to deliver the first portion of the fluid energy to the sensing element, the pressure chamber is configured to deliver the second portion of the fluid energy to the energy accumulator, and the energy accumulator is configured to exert a pressure on the fluid in the pressure chamber using the stored energy.

Example 16: The valve of example 15, further comprising: a pressure sensor configured to generate a signal indicative of a sensed pressure; and control circuitry configured to: determine the sensed pressure based on the signal; and increase or decrease a pressure in the pressure chamber based on a comparison of the sensed pressure and a pressure setpoint, wherein the control circuitry is configured to:

increase the pressure in the pressure chamber by at least causing the one or more valves to enable the fluid having the fluid energy to flow from the valve inlet to the pressure chamber through the inlet pressure line; and decrease the pressure in the pressure chamber by at least causing the one or more valves to enable the fluid in the pressure chamber to discharge from the pressure chamber to the valve outlet through the outlet pressure line.

Example 17: The valve of any combination of examples 15-16, wherein the energy accumulator is configured to generate the stored energy when a pressure in the pressure chamber increases, and wherein the energy accumulator is configured to discharge at least a portion of the stored energy when the pressure in the pressure chamber decreases.

Example 18: The valve of any combination of examples 15-17, wherein the energy accumulator is configured to discharge at least a portion of the stored energy when the one or more valves enable the fluid in the pressure chamber to discharge from the pressure chamber to the valve outlet through the outlet pressure line.

Example 19: A method comprising: determining, using control circuitry, a sensed pressure based on a signal from a pressure sensor; comparing, using the control circuitry, the sensed pressure and a pressure setpoint; altering, using control circuitry, a pressure in a pressure chamber of a valve based on the comparison of the sensed pressure and the pressure setpoint by: increasing the pressure in the pressure chamber by causing, using the control circuitry, a pressurizing valve to enable a fluid having a fluid energy to flow to the pressure chamber; and decreasing the pressure in the pressure chamber by causing, using the control circuitry, a venting valve to enable the fluid to discharge from the pressure chamber.

Example 20: The method of example 19, further comprising: delivering a first portion of the fluid energy to a sensing element of the valve; delivering a second portion of the fluid energy to an energy accumulator of the valve; positioning a restricting element of the valve using the sensing element and the first portion of the fluid energy; and storing energy using the energy accumulator and the second portion of the fluid energy.

Various examples have been described. These and other examples are within the scope of the following claims.

What is claimed is:

1. A valve comprising:
a restricting element;
a valve body defining a pressure chamber;
one or more valves in fluid communication with the pressure chamber, wherein the one or more valves are configured to enable a fluid having a fluid energy to flow to the pressure chamber;
a sensing element configured to position the restricting element using a first portion of the fluid energy; and
an energy accumulator configured to generate stored energy using a second portion of the fluid energy,
wherein the energy accumulator comprises:
an elastic member having a first end and a second end; and
a plate;
wherein the elastic member is configured to be compressed between the plate and the sensing element;
wherein the energy accumulator is configured to translate the plate using the fluid energy in the pressure chamber to generate a compression of the elastic member between the first end and the second end;

wherein the pressure chamber is configured to deliver the first portion of the fluid energy to the sensing element, and wherein the pressure chamber is configured to deliver the second portion of the fluid energy to the energy accumulator.

2. The valve of claim 1, wherein the energy accumulator is configured to exert a pressure on a fluid in the pressure chamber using the stored energy.

3. The valve of claim 1, wherein the energy accumulator is configured to generate the stored energy when a pressure in the pressure chamber increases, and wherein the energy accumulator is configured to discharge at least a portion of the stored energy when the pressure in the pressure chamber decreases.

4. The valve of claim 1 further comprising:

a valve inlet; and an inlet pressure line between the pressure chamber and the valve inlet, wherein the one or more valves are configured to enable the fluid having the fluid energy to flow to the pressure chamber through the inlet pressure line.

5. The valve of claim 1, wherein the one or more valves are configured to enable a fluid in the pressure chamber to discharge from the pressure chamber.

6. The valve of claim 5, wherein the energy accumulator is configured to discharge at least a portion of the stored energy when the one or more valves enable the fluid in the pressure chamber to discharge from the pressure chamber.

7. The valve of claim 5, further comprising:

a valve outlet; and an outlet pressure line between the pressure chamber and the valve outlet, wherein the one or more valves are configured to enable the fluid in the pressure chamber to discharge from the pressure chamber through the outlet pressure line.

8. The valve of claim 1, further comprising:

a pressure sensor configured to generate a signal indicative of a sensed pressure; and control circuitry configured to:

determine the sensed pressure based on the signal, and increase or decrease a pressure in the pressure chamber based on a comparison of the sensed pressure and a pressure setpoint, wherein the control circuitry is configured to:

increase the pressure in the pressure chamber by at least causing the one or more valves to enable the fluid having the fluid energy to flow to the pressure chamber; and decrease the pressure in the pressure chamber by at least causing the one or more valves to enable a fluid in the pressure chamber to discharge from the pressure chamber.

9. The valve of claim 1, further comprising a valve body defining a flow path from a valve inlet to a valve outlet, wherein:

the pressure chamber is configured to exert a first force in a first direction on the restricting element using a first pressure of a fluid in the pressure chamber, and the sensing element is configured to exert a force in a second direction on the restricting element using a second pressure of a fluid in the flow path.

10. The valve of claim 1, further comprising a valve body defining a flow path from a valve inlet to a valve outlet, wherein:

a first area within the valve body and defined at least in part by the sensing element is configured to generate a first force on the restricting element when the first area is in fluid communication with a fluid in the pressure chamber, a second area within the valve body and defined at least in part by the sensing element is configured to generate a second force opposite the first force on the restricting element when the second area is in fluid communication with a fluid in the flow path, and the first area is less than the second area.

11. The valve of claim 1, wherein the one or more valves include a pressurizing valve configured to enable the fluid to flow to the pressure chamber and a venting valve configured to enable the fluid in the pressure chamber to discharge from the pressure chamber.

12. The valve of claim 1, wherein the one or more valves includes a three-way valve having at least a first position and a second position, wherein the three-way valve is configured to enable the fluid to flow to the pressure chamber in the first position and to enable the fluid in the pressure chamber to discharge from the pressure chamber in the second position.

13. The valve of claim 1, wherein the energy accumulator is configured to generate the stored energy by at least compressing a gas using the second portion of the fluid energy.

14. The valve of claim 1, wherein the energy accumulator is configured to generate the stored energy by at least compressing a spring element using the second portion of the fluid energy.

15. A valve comprising:

a valve inlet;

a valve outlet;

a restricting element between the valve inlet and the valve outlet;

a valve body defining a pressure chamber;

an inlet pressure line between the valve inlet and the pressure chamber;

an outlet pressure line between the valve outlet and the pressure chamber;

one or more valves in fluid communication with the pressure chamber, wherein the one or more valves are configured to:

enable a fluid having a fluid energy to flow from the valve inlet to the pressure chamber through the inlet pressure line, and configured to enable the fluid in the pressure chamber to discharge from the pressure chamber to the valve outlet through the outlet pressure line;

a sensing element configured to position the restricting element using a first portion of the fluid energy; and an energy accumulator configured to generate stored energy using a second portion of the fluid energy, wherein:

the energy accumulator comprises:

an elastic member having a first end and a second end; and a plate;

wherein the elastic member is configured to be compressed between the plate and the sensing element;

the energy accumulator is configured to translate the plate using the fluid energy in the pressure chamber to generate a compression of the elastic member between the first end and the second end;

the pressure chamber is configured to deliver the first portion of the fluid energy to the sensing element, the pressure chamber is configured to deliver the second portion of the fluid energy to the energy accumulator, and the energy accumulator is configured to exert a pressure on the fluid in the pressure chamber using the stored energy.

16. The valve of claim 15, further comprising:

a pressure sensor configured to generate a signal indicative of a sensed pressure; and control circuitry configured to:

determine the sensed pressure based on the signal; and increase or decrease a pressure in the pressure chamber based on a comparison of the sensed pressure and a pressure setpoint, wherein the control circuitry is configured to:

increase the pressure in the pressure chamber by at least causing the one or more valves to enable the fluid having the fluid energy to flow from the valve inlet to the pressure chamber through the inlet pressure line; and decrease the pressure in the pressure chamber by at least causing the one or more valves to enable the fluid in the pressure chamber to discharge from the pressure chamber to the valve outlet through the outlet pressure line.

17. The valve of claim 15, wherein the energy accumulator is configured to generate the stored energy when a pressure in the pressure chamber increases, and wherein the energy accumulator is configured to discharge at least a portion of the stored energy when the pressure in the pressure chamber decreases.

18. The valve of claim 15, wherein the energy accumulator is configured to discharge at least a portion of the stored energy when the one or more valves enable the fluid in the pressure chamber to discharge from the pressure chamber to the valve outlet through the outlet pressure line.

* * * * *